(12) United States Patent
Park

(10) Patent No.: US 11,285,941 B2
(45) Date of Patent: Mar. 29, 2022

(54) ELECTRONIC DEVICE FOR VEHICLE AND OPERATING METHOD THEREOF

(71) Applicant: LG ELECTRONICS INC., Seoul (KR)

(72) Inventor: Yongsoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 16/500,723

(22) PCT Filed: Jul. 16, 2019

(86) PCT No.: PCT/KR2019/008789
§ 371 (c)(1),
(2) Date: Oct. 3, 2019

(87) PCT Pub. No.: WO2021/010517
PCT Pub. Date: Jan. 21, 2021

(65) Prior Publication Data
US 2021/0276544 A1 Sep. 9, 2021

(51) Int. Cl.
*B60W 30/08* (2012.01)
*H04W 4/40* (2018.01)
(Continued)

(52) U.S. Cl.
CPC ........... *B60W 30/08* (2013.01); *B60W 40/02* (2013.01); *B60W 40/105* (2013.01);
(Continued)

(58) Field of Classification Search
CPC .... B60W 30/08; B60W 40/02; B60W 40/105; B60W 50/14; B60W 2556/45;
(Continued)

(56) References Cited

U.S. PATENT DOCUMENTS 10,198,619 B1 * 2/2019 Zhu .................. G06Q 10/02
10,486,692 B2 * 11/2019 Nishimura ............ B60W 30/09
(Continued)

FOREIGN PATENT DOCUMENTS

| EP | 1300717 A2 * | 4/2003 | ............. G01C 21/36 |
| EP | 2774133 A1 * | 9/2014 | ............. G08G 1/163 |
| JP | 6600001 B2 * | 10/2019 | ............. B60W 10/18 |

OTHER PUBLICATIONS

Machine translation of JP-6600001-B2 (Year: 2019).*
Machine translation of EP-2774133-A1 (Year: 2014).*

*Primary Examiner* — Nicholas Kiswanto
*Assistant Examiner* — Mohamad O El Sayah
(74) *Attorney, Agent, or Firm* — Birch, Stewart, Kolasch & Birch, LLP

(57) ABSTRACT

The present invention relates to an electronic device for a vehicle and an operation method thereof. The electronic device, which performs transmission and reception of information with other vehicles through direction communication, includes an interface unit, and a processor for acquiring traveling environment information on a travel road through the interface unit, determining a first distance, which is an estimated arrival distance of a vehicle-to-everything (V2X) communication signal, based on the traveling environment information, calculating a first time, which is a time to prepare for danger defined by the first distance versus a speed of the vehicle, and generating a signal to control the speed of the vehicle, for secure of the time to prepare for danger. Data produced in the vehicle electronic device can be transmitted to an external device through a 5G communication system. The electronic device of an autonomous device of the present invention may be linked to or combined with an artificial intelligence module, a drone (unmanned aerial vehicle (UAV), a robot, an augmented reality (Continued)

(AR) device, devices associated with virtual reality (VR) and 5G services, etc.

19 Claims, 20 Drawing Sheets

(51) Int. Cl.
*B60W 40/02* (2006.01)
*B60W 40/105* (2012.01)
*B60W 50/14* (2020.01)

(52) U.S. Cl.
CPC .............. *B60W 50/14* (2013.01); *H04W 4/40* (2018.02); *B60W 2050/146* (2013.01); *B60W 2554/80* (2020.02); *B60W 2556/45* (2020.02); *B60W 2720/10* (2013.01)

(58) Field of Classification Search
CPC ....... B60W 2554/80; B60W 2050/146; B60W 2720/10; H04W 4/40
See application file for complete search history.

(56) References Cited

U.S. PATENT DOCUMENTS

| | | | |
|---|---|---|---|
| 2008/0306668 A1* | 12/2008 | Wang | B60K 31/00 701/93 |
| 2017/0243485 A1* | 8/2017 | Rubin | H04W 4/026 |
| 2019/0059071 A1* | 2/2019 | Khoryaev | H04W 64/006 |
| 2019/0385458 A1* | 12/2019 | Garrett | G08G 1/166 |
| 2020/0023839 A1* | 1/2020 | Yan | B60W 40/09 |
| 2020/0077238 A1* | 3/2020 | Alexander | H04W 60/04 |
| 2020/0186979 A1* | 6/2020 | Liu | G08G 1/163 |

* cited by examiner

10

100 ELECTRONIC DEVICE

FIG. 8

|  | Downtown Area, Speed of Vehicle 10: 60 km/h | | Expressway, Speed of Vehicle 10: 70 km/h | |
|---|---|---|---|---|
| Average PRR | LTE-V2X | DSRC | LTE-V2X | DSRC |
| 90% | 83.70m | 58.91m | 181.69m | 152.49m |

FIG. 12

| | First Period(P1) | Second Period(P2) | Third Period(P3) | Fourth Period(P4) | Fifth Period(P5) |
|---|---|---|---|---|---|
| | 0.SEC     1.SEC     3.SEC     5.SEC     7.SEC | | | | |
| Danger Level | Very Dangerous (901) | Dangerous (902) | Normal (903) | Safe (904) | Very Safe (905) |
| Color | Red | Orange | Yellow | Green | Blue |

FIG. 17

|  | First Point (1501) | Second Point (1502) | Third Point (1503) | Fourth Point (1504) | Fifth Point (1505) |
|---|---|---|---|---|---|
| First Distance (m) | 120 | 100 | 88 | 80 | 60 |
| Current Speed (m/s) | 22 | 22 | 22 | 20 | 15 |
| First Time (sec) | 5.45 | 4.54 | 4 | 4 | 4 |

ELECTRONIC DEVICE FOR VEHICLE AND OPERATING METHOD THEREOF

CROSS REFERENCE TO RELATED APPLICATIONS

This application is the National Phase of PCT/KR2019/008789 filed on Jul. 16, 2019, which is hereby expressly incorporated by reference into the present application.

TECHNICAL FIELD

The present invention relates to an electronic device for vehicles and an operating method of the electronic device for vehicles.

BACKGROUND ART

A vehicle is an apparatus movable in a desired direction by a user seated therein. A representative example of such a vehicle is an automobile. An autonomous vehicle means a vehicle which can automatically travel without manipulation of a person.

An autonomous vehicle travels while recognizing a peripheral environment therearound by a sensor installed in the vehicle such as a lidar, a radar or a camera. However, it is difficult to recognize the peripheral environment or to sense a blind spot at the current technology level. There may be a possibility in which software errors may be generated. In addition, there may be weakness against bad weather.

For safer and more convenient autonomous travel, active research is conducted into a technology for supplementing insufficient functions of the sensor through communication. In connection with this, vehicle-to-everything (V2X) means exchange of information with other vehicles, mobile appliances, and things such as roads through a wired or wireless network or a technology thereof.

V2X is based on dedicated short-range communications (DSRC). Direct communication may have characteristics of a variation in the arrival distance of a communication signal according to a communication situation between two mediums. In a downtown area, there are a number of peripheral obstacles, and it may be frequently impossible to maintain a line of sight. For this reason, such a downtown area exhibits a very short arrival distance of communication signals, as compared to an expressway where there are few obstacles. In particular, when the arrival distance of a communication signal is abruptly varied in accordance with a situation, there is a problem of an increased possibility of occurrence of an accident.

DISCLOSURE

Technical Problem

Therefore, the present invention has been made in view of the above problems, and it is an object of the present invention to provide an electronic device for a vehicle capable of recognizing a peripheral obstacle situation, and estimating a variation in the arrival distance of a communication signal, thereby safely controlling the vehicle even when the arrival distance of the communication signal is abruptly varied.

It is another object of the present invention to provide an operating method of an electronic device for a vehicle capable of controlling a speed of the vehicle in order to secure a time to prepare for danger defined by an estimated arrival distance of a V2X communication signal versus a speed of the vehicle.

Objects of the present invention are not limited to the above-described objects, and other objects of the present invention not yet described will be more clearly understood by those skilled in the art from the following detailed description.

Technical Solution

In accordance with the present invention, the above objects can be accomplished by the provision of an operating method of an electronic device for a vehicle including: receiving, by a processor, sensor data; extracting, by the processor, traveling environment information based on the sensor data; determining, by the processor, a first distance, which is an estimated arrival distance of a vehicle-to-evryting (V2X) communication signal, based on the traveling environment information; calculating, the processor, a first time, which is a time to prepare for danger defined by the first distance versus a speed of the vehicle; and generating, by the processor, a signal to control the speed of the vehicle, for secure of the first time.

The operating method of the electronic device for the vehicle according to the present invention includes the steps of classifying the first time in accordance with periods, calculating the first time on a real-time basis, and generating a signal to display a danger state message representing a danger level of a period to which the first time calculated on a real-time basis.

The operating method of the electronic device for the vehicle according to the present invention includes the steps of generating a signal to display shift of the period to a driver through an interface unit, and generating the acceleration control signal based on an input signal from the driver.

In accordance with an embodiment of the present invention, peripheral object information is acquired using a radar and an advanced driver-assistance system (ADAS) camera of the vehicle, and a traveling environment state may be classified based on the object information.

In accordance with an embodiment of the present invention, whether a line-of-sight (LOS) environment has been damaged may be determined based on object information acquired by an object detection device. When the possibility in which an LOS environment is damaged is high, the possibility in which a V2X signal is damaged may increase.

In accordance with an embodiment of the present invention, it may be possible to determine whether or a communication channel is congested by checking whether a packet error rate (PER) or a retransmission rate (RR) is equal to or higher than a predetermined reference value. When the communication channel is congested, the possibility of damage to the V2X signal may increase.

In accordance with an embodiment of the present invention, a farthest one of arrival distances of V2X messages is determined. When the determined arrival distance is farther than the first distance which is an estimated arrival distance, the V2X message may be determined to be a false alarm having a high possibility of damage to the V2X signal.

In accordance with an embodiment of the present invention, a maximum arrival distance is extracted from among V2X messages received from other vehicles traveling in a traveling direction. Only when the first distance is farther than the maximum arrival distance, vehicle speed control is performed and, as such, false alarm probability may be reduced.

In accordance with an embodiment of the present invention, when the first distance is farther than the maximum arrival distance, only messages associated with the subject vehicle are extracted from V2X messages, to be used for vehicle speed control.

In accordance with an embodiment of the present invention, the first time, which is a time to prepare for danger, may be calculated by dividing an estimated arrival distance of the V2X signal by the speed of the vehicle.

In accordance with an embodiment of the present invention, the first time is classified into periods in such a manner that the first time is classified into a first period when the first time exceeds 0 seconds, but is equal to or less than 1 second, a second period when the first time exceeds 1 second, but is equal to or less than 3 seconds, a third period when the first time exceeds 3 seconds, but is equal to or less than 5 seconds, a fourth period when the first time exceeds 5 seconds, but is equal to or less than 7 seconds, and a fifth period when the first time exceeds 7 seconds.

In accordance with an embodiment of the present invention, messages of periods of the first time are set, and are displayed to the driver on a real-time basis. In addition, when a period shift occurs, a danger may be informed.

In accordance with an embodiment of the present invention, when an abrupt accident or a traffic delay phenomenon occurs in a traveling direction in the third period during traveling, the first distance is reduced and, as such, a period shift to the second period may occur due to a deceleration in first time. In this case, the period shift to the second period and a danger state message may be displayed.

An embodiment of the present invention may include an autonomous vehicle varying a speed through period information of the first time.

In accordance with an embodiment of the present invention, through setting of a minimum time to prepare for danger, it may be possible to acceleration-control the speed of the vehicle when the first time is longer than the minimum time to prepare for danger while deceleration-controlling the speed of the vehicle when the first time is shorter than the minimum time to prepare for danger.

The first distance and the first time may be reduced as the traveling environment information becomes complex when the vehicle enters a downtown area from a suburb. In this case, when the first time becomes shorter than the minimum time to prepare for danger, the speed of the vehicle may be reduced, to cope with a dangerous situation.

The first distance and the first time may be increased as the traveling environment information becomes simple when the vehicle enters a suburb from a downtown area. In this case, when the first time becomes longer than the minimum time to prepare for danger, the speed of the vehicle may be increased, to prevent a traffic jam.

Concrete matters of other embodiments will be apparent from the detailed description and the drawings.

Advantageous Effects

In accordance with the present invention, one or more effects are provided as follows.

First, there is an effect of estimating an arrival distance of a V2X communication signal based on in-vehicle sensor data.

Second, there is an effect of reducing false alarms through extraction of an arrival distance of a farthest V2X message.

Third, there is an effect of reducing a possibility of occurrence of an accident by calculating a time to prepare for danger.

Fourth, there is an effect of enabling the driver to intuitionally recognize a dangerous state by classifying a time to prepare for danger on a period basis, and displaying a state message corresponding thereto.

The effects of the present invention are not limited to the above-described effects and other effects which are not described herein may be derived by those skilled in the art from the following description of the embodiments of the disclosure.

DESCRIPTION OF DRAWINGS

The above and other objects, features and other advantages of the present invention will be more clearly understood from the following detailed description taken in conjunction with the accompanying drawings, in which:

FIG. 8 is a diagram illustrating results of a first distance measurement simulation according to an embodiment of the present invention.

FIGS. 12, 13A, and 13B are views illustrating danger state messages in periods of a first time according to an embodiment of the present invention.

FIGS. 14 to 17 are diagrams illustrating a procedure of generating the first time and a speed control signal on a general road in a downtown area or an expressway in accordance with an embodiment of the present invention.

BEST MODE

Figure 1:
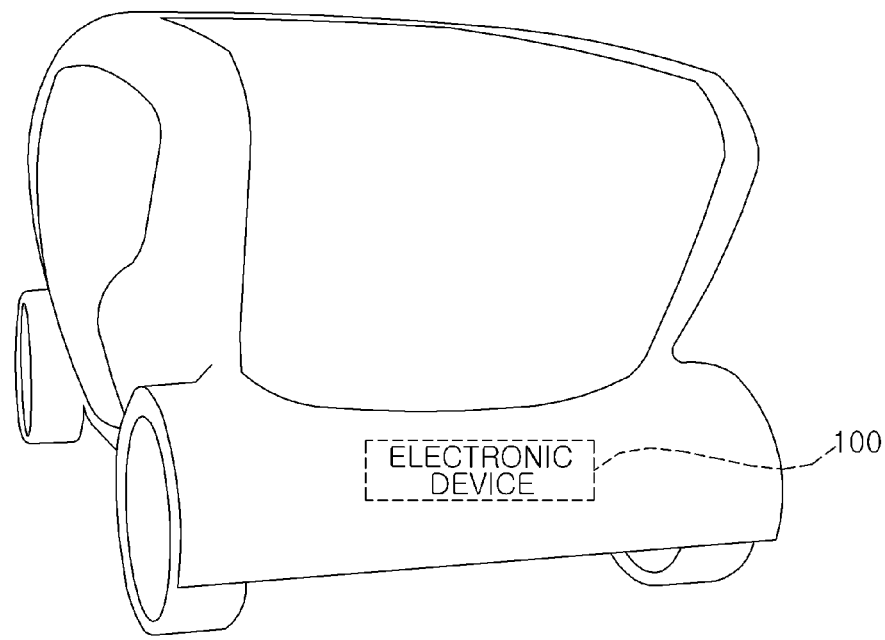
FIG. 1 is a view illustrating an appearance of a vehicle according to an embodiment of the present invention.
Figure 1:
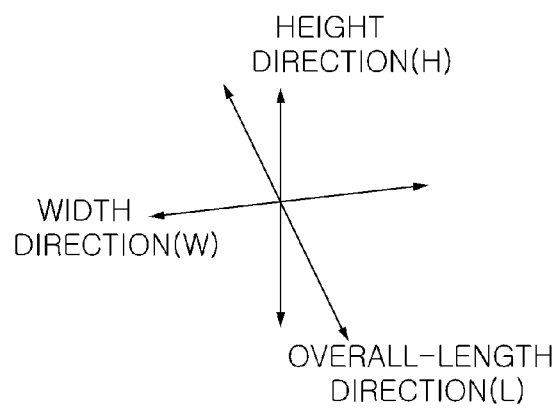

Reference will now be made in detail to the exemplary embodiments of the present invention, examples of which are illustrated in the accompanying drawings. Identical or similar constituent elements will be designated by the same reference numeral even though they are depicted in different drawings. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

It will be understood that, although the terms "first", "second", "third" etc. may be used herein to describe various elements, these elements should not be limited by these terms. These terms are only used to distinguish one element from another element.

It will be understood that, when an element is referred to as being "connected to" or "coupled to" another element, it may be directly connected or coupled to the other element, or intervening elements may be present. In contrast, when an element is referred to as being "directly connected to" or "directly coupled to" another element or layer, there are no intervening elements present.

The singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or groups thereof.

FIG. 1 is a view illustrating an appearance of a vehicle according to an embodiment of the present invention.

Referring to FIG. 1, the vehicle 10 according to the embodiment of the present invention is defined as a transportation means to travel on a road or a railway line. The vehicle 10 is a concept including an automobile, a train, and a motorcycle. The vehicle 10 may be a concept including all of an internal combustion engine vehicle including an engine as a power source, a hybrid vehicle including an engine and an electric motor as a power source, an electric vehicle including an electric motor as a power source, etc. The vehicle 10 may be a shared vehicle. The vehicle 10 may be an autonomous vehicle.

An electronic device 100 may be included in the vehicle 10. The electronic device 100 may be a device for determining an estimated arrival distance of a V2X communication signal in the vehicle 10, and controlling a vehicle speed. The vehicle 10 may control a vehicle speed based on a vehicle speed control signal generated from the electronic device 100.

Meanwhile, the vehicle 10 may co-operate with at least one robot. The robot may be an autonomous mobile robot (AMR) which is autonomously movable. The mobile robot is configured to be autonomously movable and, as such, is freely movable. The mobile robot may be provided with a plurality of sensors to enable the mobile robot to bypass an obstacle during travel and, as such, may travel while bypassing obstacles. The mobile robot may be a flying robot (for example, a drone) including a flying device. The mobile robot may be a wheeled robot including at least one wheel, to move through rotation of the wheel. The mobile robot may be a leg type robot including at least one leg, to move using the leg.

The robot may function as an apparatus for supplementing convenience of the user. For example, the robot may perform a function for transporting a load carried in the vehicle 10 to a user's final destination. For example, the robot may perform a function for guiding a way to a final destination to the user exited the vehicle 10. For example, the robot may perform a function for transporting the user exited the vehicle 10 to a final destination.

At least one electronic device included in the vehicle may perform communication with the robot through a communication device 220.

At least one electronic device included in the vehicle may provide, to the robot, data processed in at least one electronic device included in the vehicle. For example, at least one electronic device included in the vehicle may provide, to the robot, at least one of object data, HD map data, vehicle state data, vehicle position data or driving plan data.

At least one electronic device included in the vehicle may receive, from the robot, data processed in the robot. At least one electronic device included in the vehicle may receive at least one of sensing data produced in the robot, object data, robot state data, robot position data or movement plan data of the robot.

At least one electronic device included in the vehicle may generate a control signal further based on data received from the robot. For example, at least one electronic device included in the vehicle may compare information as to an object produced in an object detection device 210 with information as to an object produced by the robot, and may generate a control signal based on compared results.

At least one electronic device included in the vehicle may generate a control signal in order to prevent interference between a travel path of the vehicle 10 and a travel path of the robot.

At least one electronic device included in the vehicle may include a software module or a hardware module (hereinafter, an artificial intelligence (AI) module) realizing artificial intelligence.

At least one electronic device included in the vehicle may input acquired data to the artificial intelligence module, and may use data output from the artificial intelligence module.

The artificial intelligence module may execute machine learning of input data, using at least one artificial neural network (ANN). The artificial intelligence module may output driving plan data through machine learning of input data.

At least one electronic device included in the vehicle may generate a control signal based on data output from the artificial intelligence module.

In accordance with an embodiment, at least one electronic device included in the vehicle may receive data processed through artificial intelligence from an external device via the communication device 220. At least one electronic device included in the vehicle may generate a control signal based on data processed through artificial intelligence.

Figure 2:
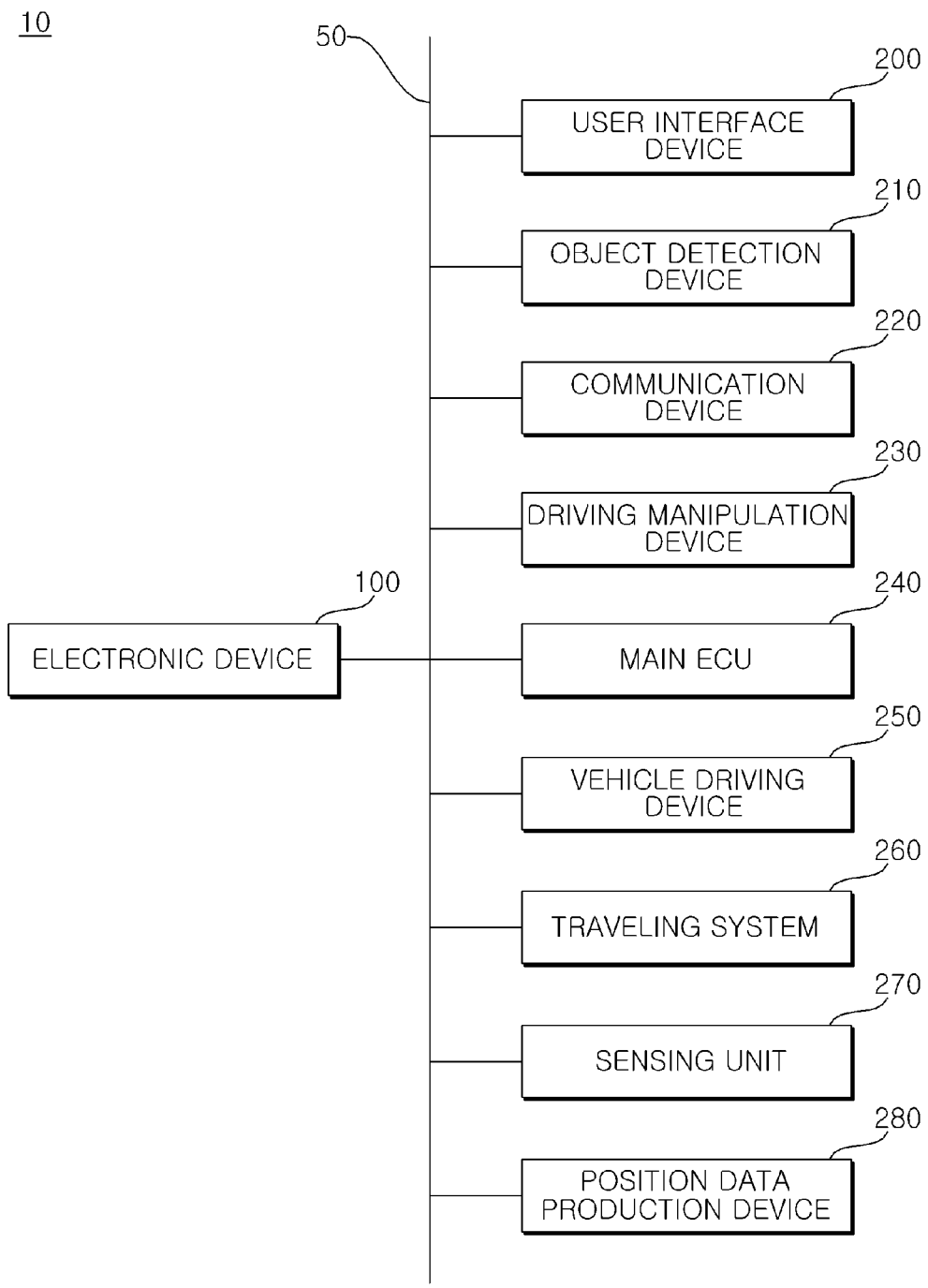
FIG. 2 is a control block diagram of the vehicle according to an embodiment of the present invention.

FIG. 2 is a control block diagram of the vehicle according to an embodiment of the present invention.

Referring to FIG. 2, the vehicle 10 may include the electronic device 100, a user interface device 200, the object detection device 210, the communication device 220, a driving manipulation device 230, a main electronic control device (ECU) 240, a vehicle driving device 250, a traveling system 260, a sensing unit 270, and a position data production device 280.

The electronic device 100 may detect an object through the object detection device 210. The electronic device 100 may exchange data with a peripheral vehicle, using the communication device 220. The electronic device 100 may control motion of the vehicle 10 or generate a signal to enable output of information to the user, based on received data as to an object, using the traveling system 260. In this case, a microphone, a speaker and a display included in the vehicle 10 may be used. The electronic device 100 may safely control travel through the vehicle driving device 250.

The user interface device 200 is a device for enabling communication between the vehicle 10 and the user. The user interface device 200 may receive user input, and may provide information produced in the vehicle 10 to the user. The vehicle 10 may realize user interface (UI) or user experience (UX) through the user interface device 200.

The user interface device 200 may include an input unit and an output unit.

The input unit is adapted to receive information from the user. Data collected in the input unit may be processed as a control command of the user. The input unit may include an audio input unit, a gesture input unit, a touch input unit, and a mechanical input unit. The output unit is adapted to generate an output associated with a sense of sight, a sense of hearing or a sense of touch. The output unit may include at least one of a display unit, a sound output unit, or a haptic output unit.

The display unit may display a graphic object corresponding to various information. The display unit may include at least one of a liquid crystal display (LCD), a thin film transistor-liquid crystal display (TFT LCD), an organic light-emitting diode (OLED), a flexible display, a 3D display, or an e-ink display.

The display unit may be formed to constitute a co-layer structure or to form an integrated structure together with the touch input unit and, as such, may be embodied as a head up display (HUD). In this case, the display unit may include a projection module and, as such, may output information through an image projected on a windshield or a window. The display unit may include a transparent display. The transparent display may be attached to a windshield or a window.

The display unit may be disposed at an area of a steering wheel, an area of an instrument panel, an area of a seat, an area of each pillar, an area of a door, an area of a center console, an area of a head lining, or an area of a sun visor, or may be implemented at an area of a windshield or an area of a window.

Meanwhile, the user interface device 200 may include a plurality of display units.

The sound output unit may convert an electrical signal provided from the processor 170 into an audio signal, and may output the converted audio signal. For this function, the sound output unit may include at least one speaker.

*75 The haptic output unit generates a tactile output. For example, the haptic output unit may operate to vibrate a steering wheel, a safety belt or a seat, thereby enabling the user to recognize an output from the haptic output unit.

Meanwhile, the user interface device 220 may be referred to as a "display device for vehicles".

The object detection device 210 may include at least one sensor capable of detecting an object outside the vehicle 10. The object detection device 210 may include at least one of a camera, a radar, a lidar, an ultrasound sensor or an infrared sensor. The object detection device 210 may provide data as to an object produced based on a sensing signal generated in the sensor to at least one electronic device included in the vehicle.

The object may be various objects associated with traveling of the vehicle 10. For example, the object may include lanes, other vehicles, pedestrians, two-wheeled vehicles, traffic signs, lights, roads, structures, speed bumps, land features, animals, etc.

Meanwhile, the object may be classified into a mobile object and a fixed object. For example, the mobile object may be a concept including other vehicles and pedestrians, and the fixed object may be a concept including traffic signs, roads, and structures.

The camera may produce information as to an object outside the vehicle 10, using an image. The camera may include at least one image sensor, and at least one processor electrically connected to the image sensor, to process a signal received from the image sensor and to produce data as to an object based on the processed signal.

The camera may be at least one of a mono camera, a stereo camera, or around view monitoring (AVM) camera. Using various image processing algorithms, the camera may acquire position information of an object, information as to a distance from the object or information as to a relative speed with respect to the object. For example, the camera may acquire information as to a distance from an object and information as to a relative speed with respect to the object from an acquired image, based on a variation in the size of the object according to time.

For example, the camera may acquire distance information and relative speed information associated with an object through a pin hole model, road surface profiling, etc.

For example, the camera may acquire distance information and relative speed information associated with an object from a stereo image acquired in a stereo camera, based on disparity information.

The radar may produce information as to an object outside the vehicle 10 using a radio wave. The radar may include an electromagnetic wave transmitter, an electromagnetic wave receiver, and at least one processor electrically connected to the electromagnetic wave transmitter and the electromagnetic wave receiver, to process a received signal and to produce data as to an object based on the processed signal.

The radar may be embodied through a pulse radar system or a continuous wave radar system based on a radio wave emission principle. The radar may be embodied through a frequency modulated continuous wave (FMCW) system or a frequency shift keyong (FSK) system selected from continuous wave radar systems in accordance with a signal waveform. The radar may detect an object, a position of the detected object, and a distance and a relative speed with respect to the detected object by means of an electromagnetic wave on the basis of time of flight (TOF) or phase shift.

The lidar may produce information as to an object outside the vehicle 10, using laser light. The lidar may include an optical transmitter, an optical receiver, and at least one processor electrically connected to the optical transmitter and the optical receiver, to process a received signal and to produce data as to an object based on the processed signal.

The lidar may be embodied through a time-of-flight (TOF) system and a phase shift system. The lidar may be implemented in a driven manner or a non-driven manner. When the lidar is implemented in a driven manner, the lidar may detect an object around the vehicle 10 while being rotated by a motor. When the lidar is implemented in a non-driven manner, the lidar may detect an object disposed within a predetermined range with reference to the vehicle by optical steering.

The vehicle 10 may include a plurality of non-driven lidars. The lidar may detect an object, a position of the detected object, and a distance and a relative speed with respect to the detected object by means of laser light on the basis of time of flight (TOF) or phase shift.

The communication device 220 may exchange a signal with a device disposed outside the vehicle 10. The communication device 220 may exchange a signal with at least one of an infrastructure (for example, a server or a broadcasting station) or another vehicle. The communication device 220 may include at least one of a transmission antenna, a reception antenna, a radio frequency (RF) circuit or an RF element capable of implementing various communication protocols in order to execute communication.

The communication device 220 may include a short-range communication unit, a position information unit, a V2X communication unit, an optical communication unit, a broadcast transceiver, and an intelligent transport systems (ITS) communication unit.

The V2X communication unit is a unit for performing wireless communication with a server (V2I: Vehicle to Infrastructure), another vehicle (V2V: Vehicle to Vehicle), or a pedestrian (V2P: Vehicle to Pedestrian). The V2X communication unit may include a radio frequency (RF) circuit capable of implementing protocols of communication with infrastructure (V2I), communication with another vehicle (V2V), and communication with a pedestrian (V2P).

Meanwhile, the communication device 220 may embody a display device for vehicles together with the user interface device 200. In this case, the display device for vehicles may be referred to as a "telematics device" or an auto video navigation (AVN) device.

The communication device 220 may communicate with a device disposed outside the vehicle 10, using a 5G (for example, new radio (NR)) system. The communication device 220 may implement V2X (V2V, V2D, V2P or V2N) communication using the 5G system.

Figure 4A:
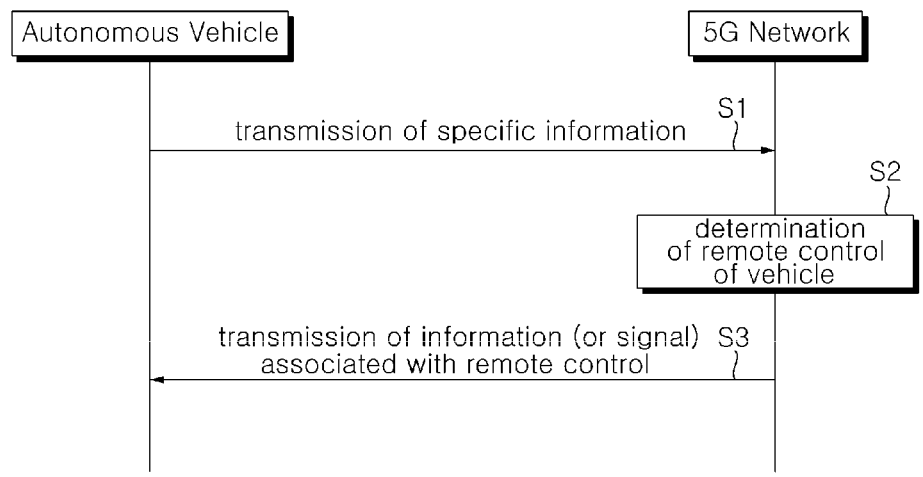
FIGS. 4A and 4B illustrate examples of basic operations and application operations of an autonomous vehicle and a 5G network in a 5G communication system.
Figure 4B:
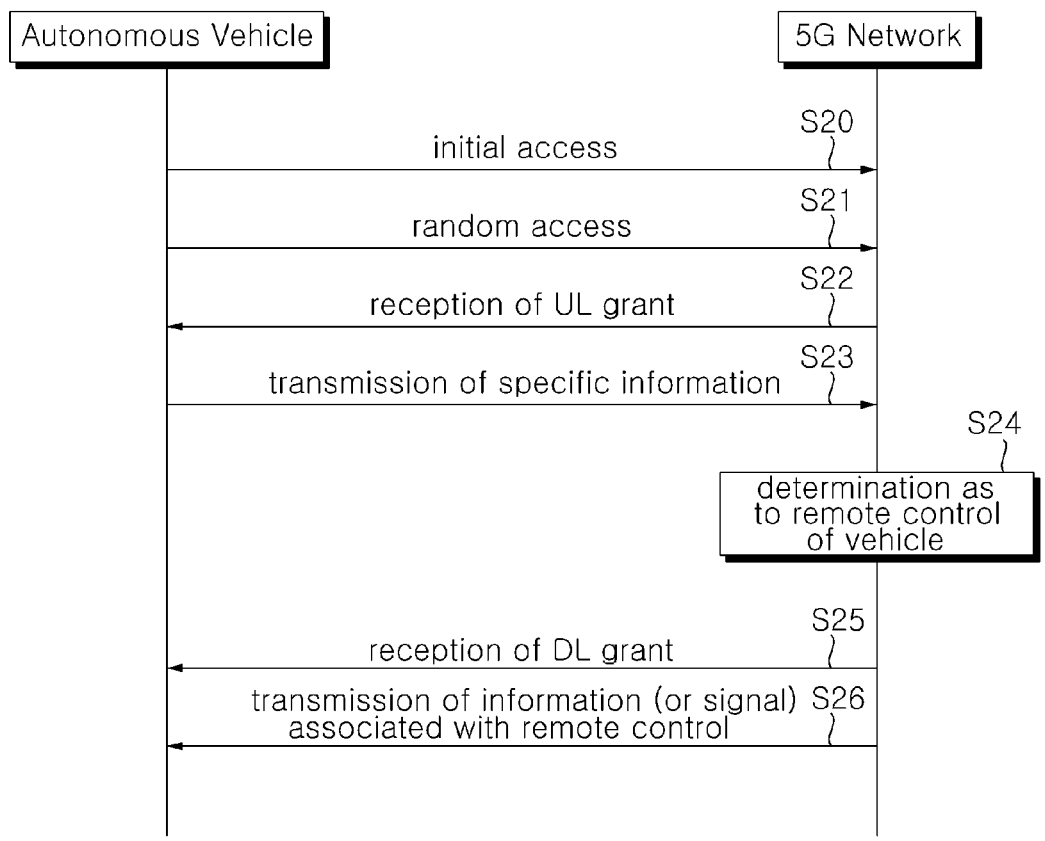

FIGS. 4A and 4B illustrate examples of basic operations and application operations of an autonomous vehicle and a 5G network in a 5G communication system, respectively.

FIG. 4A illustrates an example of basic operations of the autonomous vehicle and the 5G network in the 5G communication system.

The autonomous vehicle transmits specific information to the 5G network (S1).

The specific information may include information associated with autonomous traveling.

The autonomous traveling-associated information may be information directly associated with vehicle traveling control. For example, the autonomous traveling-associated information may include at least one of object data indicating an object around the vehicle, map data, vehicle state data, vehicle position data, or driving plan data.

The autonomous traveling-associated information may further include service information required for autonomous traveling, etc. For example, the specific information may include information input through a user terminal as to a destination and a safety grade of the vehicle. In addition, the 5G network may determine whether remote control of the vehicle is executed (S2).

In this case, the 5G network may include a server or a module for executing remote control associated with autonomous traveling.

In addition, the 5G network may transmit information (or a signal) associated with remote control to the autonomous vehicle (S3).

As described above, the information associated with the remote control may be a signal directly applied to the autonomous vehicle, and may further include service information required for autonomous traveling. In an embodiment of the present invention, the autonomous vehicle may provide services associated with autonomous traveling by receiving service information such as information as to section-based insurance and a dangerous section selected on a travel path through a server connected to the 5G network.

FIG. 4B illustrates an example of application operations of the autonomous vehicle and the 5G network in the 5G communication system.

The autonomous vehicle performs a procedure of initial access to the 5G network (S20).

The initial access procedure includes a cell search procedure for acquiring a downlink (DL) operation, a procedure for acquiring system information, etc.

In addition, the autonomous vehicle performs a procedure of random access to the 5G network (S21).

The random access procedure includes a preamble transmission procedure for uplink (UL) synchronization acquisition or UL data transmission, a random access response reception procedure, etc. This will be described in a paragraph G in more detail.

In addition, the 5G network transmits, to the autonomous vehicle, a UL grant for scheduling transmission of specific information (S22).

The UL grant reception may include a procedure of receiving time/frequency resource scheduling in order to transmit UL data to the 5G network.

In addition, the autonomous vehicle transmits specific information to the 5G network based on the UL grant (S23).

The 5G network then determines whether remote control of the vehicle is executed (S24).

The autonomous vehicle then receives a DL grant through a downlink control channel in order to receive a response to the specific information from the 5G network (S25).

The 5G network then transmits information (or a signal) associated with remote control to the autonomous vehicle based on the DL grant (S26).

The driving manipulation device 230 is a device for receiving user input for driving. In a manual mode, the vehicle 10 may be driven based on a signal provided by the driving manipulation device 230. The driving manipulation device 230 may include a steering input device (for example, a steering wheel), an acceleration input device (for example, an accelerator pedal), and a brake input device (for example, a brake pedal).

The main ECU 240 may control overall operation of at least one electronic device included in the vehicle 10.

The driving control device 250 is a device for electrically controlling various vehicle driving devices in the vehicle 10. The driving control device 250 may include a power train driving control device, a chassis driving control device, a door/window driving control device, a safety device driving control device, a lamp driving control device, and an air condition driving control device. The power train driving control device may include a power source driving control device and a transmission driving control device. The chassis driving control device may include a steering driving control device, a brake driving control device, and a suspension driving control device.

Meanwhile, the safety device driving control device may include a safety belt driving control device for safety belt control.

The vehicle driving device 250 may be referred to as a "control electronic control unit (ECU)".

The traveling system 260 may control motion of the vehicle 10 or may generate a signal for outputting information to the user, based on data as to an object received from the object detection device 210. The traveling system 260 may provide the generated signal to at least one of the user interface device 200, the main ECU 240 or the vehicle driving device 250.

The traveling system 260 may be a concept including an advanced driver-assistance system (ADAS). The ADAS 260 may embody an adaptive cruise control (ACC) system, an autonomous emergency braking (AEB) system, a forward collision warning (FCW) system, a lane keeping assist (LKA) system, a lane change assist (LCA) system, a target following assist (TFA) system, a blind sport detection (BSD) system, an adaptive high beam assist (HBA) system, an auto parking system (APS), a pedestrian (PD) collision warning system, a traffic sign recognition (TSR) system, a traffic sign assist (TSA) system, a night vision (NV) system, a driver status monitoring (DSM) system, or a traffic jam assist (TJA) system.

The traveling system 260 may include an autonomous electronic control unit (ECU). The autonomous ECU may set an autonomous travel path based on data received from at least one of other electronic devices in the vehicle 10. The autonomous ECU may set an autonomous travel path based on data received from at least one of the user interface device 200, the object detection device 210, the communication device 220, the sensing unit 270, or the position data production device 280. The autonomous traveling ECU may generate a control signal to enable the vehicle 10 to travel along the autonomous travel path. The control signal generated from the autonomous traveling ECU may be provided to at least one of the main ECU 240 or the vehicle driving device 250.

The sensing unit 270 may sense a state of the vehicle. The sensing unit 270 may include at least one of an inertial navigation unit (IMU) sensor, a collision sensor, a wheel sensor, a speed sensor, a slope sensor, a weight sensor, a heading sensor, a position module, a vehicle forward/backward movement sensor, a battery sensor, a fuel sensor, a tire sensor, a handle-rotation-based steering sensor, an internal vehicle temperature sensor, an internal vehicle humidity sensor, an ultrasonic sensor, an ambient light sensor, an accelerator pedal position sensor, or a brake pedal position sensor. Meanwhile, the inertial navigation unit (IMU) sensor may include at least one of an acceleration sensor, a gyro sensor, or a magnetic sensor.

The sensing unit 270 may produce vehicle state data based on a signal generated from at least one sensor. The sensing unit 270 may acquire sensing signals as to vehicle posture information, vehicle motion information, vehicle yaw information, vehicle roll information, vehicle pitch information, vehicle collision information, vehicle direction information, vehicle angel information, vehicle speed information, vehicle acceleration information, vehicle inclination information, vehicle forward/backward movement information, battery information, fuel information, tire information, vehicle lamp information, internal vehicle temperature information, internal vehicle humidity information, a steering wheel rotation angle, ambient illumination outside the vehicle, a pressure applied to the accelerator pedal, a pressure applied to the brake pedal, etc.

In addition, the sensing unit 270 may further include an accelerator pedal sensor, a pressure sensor, an engine speed sensor, an air flow sensor (AFS), an intake air temperature sensor (ATS), a water temperature sensor (WTS), a throttle position sensor (TPS), a top dead center (TDC) sensor, a crank angle sensor (CAS), etc.

The sensing unit 270 may produce vehicle state information based on sensing data. The vehicle state information may be information produced based on data sensed by various sensors included in the vehicle.

For example, the vehicle state information may include vehicle posture information, vehicle speed information, vehicle inclination information, vehicle weight information, vehicle direction information, vehicle battery information, vehicle fuel information, vehicle tire air pressure information, vehicle steering information, internal vehicle temperature information, internal vehicle humidity information, pedal position information, vehicle engine temperature information, etc.

Meanwhile, the sensing unit may include a tension sensor. The tension sensor may generate a sensing signal based on a tension state of a safety belt.

The position data production device 280 may produce position data of the vehicle 10. The position data production device 280 may include at least one of a global positioning system (GPS) or a differential global positioning system (DGPS). The position data production device 280 may produce position data of the vehicle 10 based on a signal generated from at least one of the GPS or the DGPS. In accordance with an embodiment, the position data production device 280 may correct position data based on at least one of an internal measurement unit (IMU) of the sensing unit 270 or a camera of the object detection device 210.

The position data production device 280 may be referred to as a "position measurement device". The position data production device 280 may be referred to as a "global navigation satellite system (GNSS)".

The vehicle 10 may include an inner communication system 50. Plural electronic devices included in the vehicle 10 may exchange a signal via the inner communication system 50. Data may be included in the signal. The inner communication system 50 may utilize at least one communication protocol (for example, CAN, LIN, FlexRay, MOST, or Ethernet).

Figure 3:
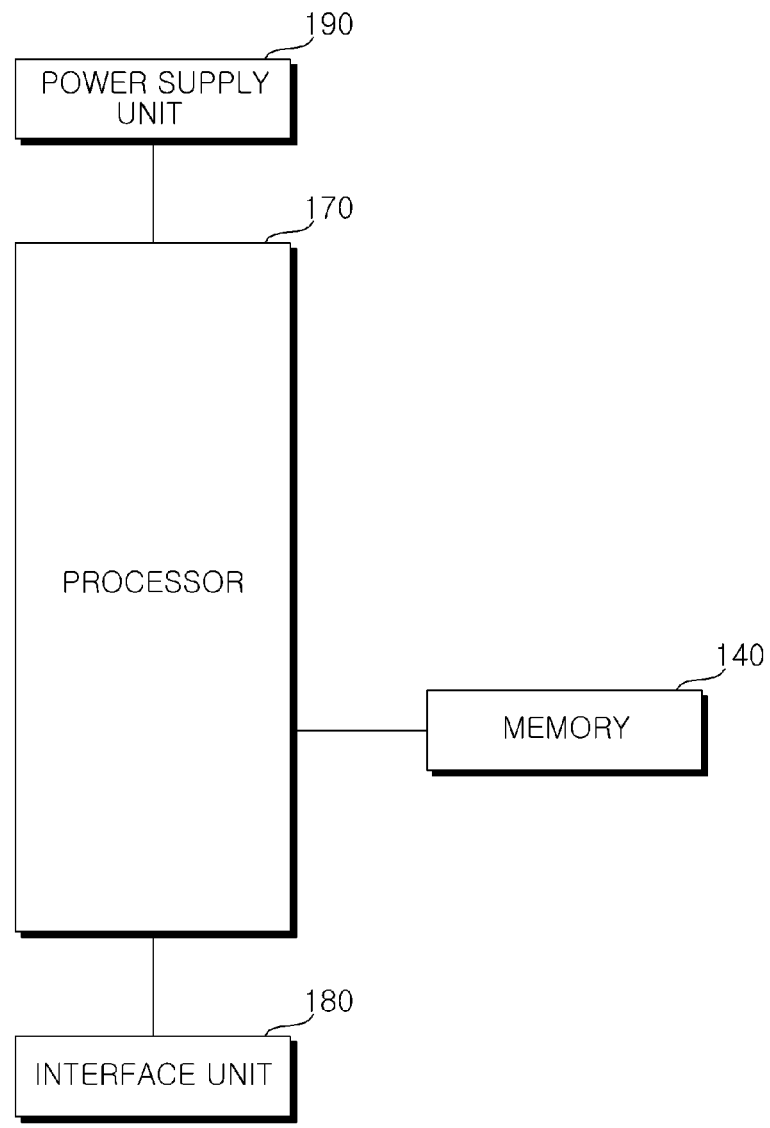
FIG. 3 is a control block diagram of an electronic device according to an embodiment of the present invention.

FIG. 3 is a control block diagram of the electronic device according to an embodiment of the present invention.

Referring to FIG. 3, the electronic device 100 may include a memory 140, a processor 170, an interface unit 180, and a power supply unit 190.

The memory 140 is electrically connected to the processor 170. The memory 140 may store basic data as to units, control data for unit operation control, and input and output data. The memory 140 may store data processed by the processor 170. The memory 140 may be constituted in a hardware manner by at least one of a read only memory (ROM), a random access memory (RAM), an erasable programmable read-only memory (EPROM), a flash drive, or a hard drive. The memory 140 may store various data for overall operation of the electronic device 100 including a program for processing or controlling the processor 170, etc. The memory 140 may be embodied to be integrated with the processor 170. In accordance with an embodiment, the memory 140 may be classified into a lower-level configuration of the processor 170.

The interface unit 180 may exchange a signal with at least one electronic device included in the vehicle 10 in a wired or wireless manner. The interface unit 280 may exchange a signal in a wired or wireless manner with at least one of the object detection device 210, the communication device 220, the driving manipulation device 230, the main ECU 240, the vehicle driving device 250, the ADAS 260, the sensing unit 170, or the position data production device 280. The interface unit 280 may be constituted by at least one of a communication module, a terminal, a pin, a cable, a port, a circuit, an element, or a device.

The interface unit 180 may receive traveling environment information of a travel road. The interface unit 180 may receive position data of the vehicle 10 from the position data production device 280. The interface unit 180 may receive travel speed data from the sensing unit 270. The interface unit 180 may receive vehicle around object data from the object detection device 210.

The power supply unit 190 may supply electric power to the electronic device 100. The power supply unit 190 may receive electric power from a power source (for example, a battery) included in the vehicle 10 and, as such, may supply electric power to each unit of the electronic device 100. The power supply unit 190 may operate in accordance with a control signal supplied from the main ECU 240. The power supply unit 190 may be embodied using a switched-mode power supply (SMPS).

The processor 170 may be electrically connected to the memory 140, the interface unit 180, and the power supply unit 190, and, as such, may exchange a signal therewith. The processor 170 may be embodied using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, or electrical units for execution of other functions.

The processor 170 may be driven by electric power supplied from the power supply unit 190. In a state in which electric power from the power supply unit 190 is supplied to the processor 170, the processor 170 may receive data, process the data, generate a signal, and supply the signal.

The processor 170 may receive information from other electronic devices in the vehicle 10 via the interface unit 180. The processor 170 may receive traveling environment information of a travel road from the object detection device 210 and the position data production device 280 via the interface unit 180. The processor 170 may supply a control signal to other electronic devices in the vehicle 10 via the interface unit 180.

The traveling environment information may include object information including kinds, number, and heights of objects disposed in a traveling direction and acquired by the object detection device 210, and GPS information acquired by the position data production device 280. The traveling environment information may include information as to the current travel road and information as to peripheral objects.

The processor 170 may determine a first distance based on traveling environment information acquired through the interface unit 180. The first distance may be an estimated arrival distance of a V2X communication signal. The first distance may be determined based on travelling environment information, taking into consideration congestion of a communication channel and a line-of-sight (LOS) environment.

The processor 170 may receive a V2X message through V2X communication. The processor 170 may receive a V2X message through the interface unit 180. The processor 170 may acquire an arrival distance on a V2X message basis, based on a V2X message and vehicle-to-vehicle position information. The V2X message arrival distance may mean an arrival distance of a V2X message actually received by the processor 170. The V2X message arrival distance may differ from the first distance which is an estimated arrival distance.

The processor 170 may acquire arrival distances of actually received V2X messages, and may discriminate the message arriving from a farthest place from among the received messages. A second distance may be a longest one of arrival distances on a message basis. The second distance may differ from the first distance. The processor 170 may determine a second distance, and may compare the determined second distance with the first distance.

Upon determining that the second distance is shorter than the first distance, the processor 170 may generate a signal for controlling a vehicle speed. Upon determining that the second distance is longer than the first distance, the processor 170 may determine that the message received from a place at a longer distance than the first distance is a false alarm. Based on the message determined to be a false alarm, the processor 170 may not generate a signal for controlling a vehicle speed.

The processor 170 may acquire speed data of the vehicle 10 from the sensing unit 270. The processor 170 may calculate a first time which is a time to prepare for danger. The time to prepare for danger may be defined by the first distance versus the speed of the vehicle 10 (first time=first distance/vehicle speed).

The first time may mean a time taken for the vehicle 10 to travel the first distance at the current speed. The first distance may be varied in accordance with a traveling environment. As such, the first time may be varied in real time. The processor 170 may calculate the first time on a real-time basis based on traveling environment information, and may generate a signal for controlling a vehicle speed in order to secure the first time.

The processor 170 may compare the first time with a minimum time to prepare for danger. The processor 170 may generate a signal for controlling a vehicle speed through comparison between the first time and the minimum time to prepare for danger.

The minimum time to prepare for danger may mean a time minimally taken until a control signal coping with a dangerous factor in a traveling situation is generated. The minimum time to prepare for danger may include a second time which is a minimum time to prepare for danger for the driver, and a third time which is a minimum time to prepare for danger for the autonomous module.

The second time may mean a minimum time taken for the driver to identify a dangerous factor in a traveling situation, and then to cope with the dangerous factor. The second time may be varied in accordance with drivers. The processor 170 may predetermine the second time, and may store the predetermined second time. Upon determining that the first time is shorter than the second time with reference to the predetermined second time, the processor 170 may generate a deceleration control signal based on the second time.

For example, when the first time is calculated to be 3 seconds under the condition that the minimum time to prepare for danger of the driver, that is, the second time, is 4 seconds, a deceleration control signal may be generated based on the second time of 4 seconds. Since speed and time are inversely proportional, a signal for reducing the speed such that the first time increases from 3 seconds to 4 seconds may be generated.

The third time may mean a minimum time taken for the processor 170 to identify a dangerous factor in a traveling situation from sensor data, and then to generate a control signal coping with the dangerous factor. The third time may be varied in accordance with autonomous performance. Upon determining that the first time is shorter than the third time, the processor 170 may generate a deceleration control signal based on the third time.

For example, when the first time is calculated to be 1 second under the condition that the minimum time to prepare for danger for the autonomous module, that is, the third time, is 2 seconds, a deceleration control signal may be generated based on the third time of 2 seconds. Since speed and time are inversely proportional, a signal for reducing the speed such that the first time increases from 1 second to 2 seconds may be generated.

Upon determining that the first time is longer than the minimum time to prepare for danger, the processor 170 may generate an acceleration control signal based on the minimum time to prepare for danger. The processor 170 may request, through the interface unit 180, an input signal from the driver as to whether an acceleration control signal should be generated. The processor 170 may generate an acceleration control signal based on the input signal from the driver.

The minimum time to prepare for danger includes the second time and the third time. The first time longer than the minimum time to prepare for danger means that the first time is longer than the second time and the third time.

For example, when the first time is 5 seconds under the condition that the second time is 4 seconds, and the third time is 2 seconds, the processor 170 may determine that the first time is longer than the minimum time to prepare for danger. Since speed and time are inversely proportional, a signal for increasing the speed such that the first time decreases from 5 second to 4 seconds may be generated. In this case, the processor 170 may request an input signal from the driver. The driver may not desire acceleration.

The processor 170 may compare the first time with the minimum time to prepare for danger. Upon determining, based on compared results, that the first time is between the second time and the third time, the processor 170 may generate a deceleration control signal further based on a longer one of the second time and the third time.

For example, when the first time is 3 seconds under the condition that the second time is 4 seconds, and the third time is 2 seconds, the processor 170 may determine that the first time is between the second time and the third time and, as such, may generate a deceleration control signal based on a longer one of the second time and the third time, that is, the second time. Since speed and time are inversely proportional, a signal for reducing the speed such that the first time increases from 3 seconds to 4 seconds may be generated.

Upon determining that the first time is shorter than a shorter one of the second time and the third time, based on comparison between the first time and the minimum time to prepare for danger, the processor may primarily generate a deceleration control signal based on a shorter one of the second time and the third time, and may secondarily generate a deceleration control signal based on a longer one of the second time and the third time.

The processor 170 may calculate the first time on a real-time basis, and may generate a signal for displaying a danger state message corresponding to the calculated first time. The danger state message may mean a state message displaying danger levels previously stored on a period basis under the condition that first times are classified into different periods.

When the period corresponding to the first time is shifted during traveling, the processor 170 may generate a signal for displaying the period shift to the driver through the interface unit 180.

The electronic device 100 may include at least one printed circuit board (PCB). The memory 140, the interface unit 180, the power supply unit 190 and the processor 170 may be electrically connected to the printed circuit board.

Figure 5:
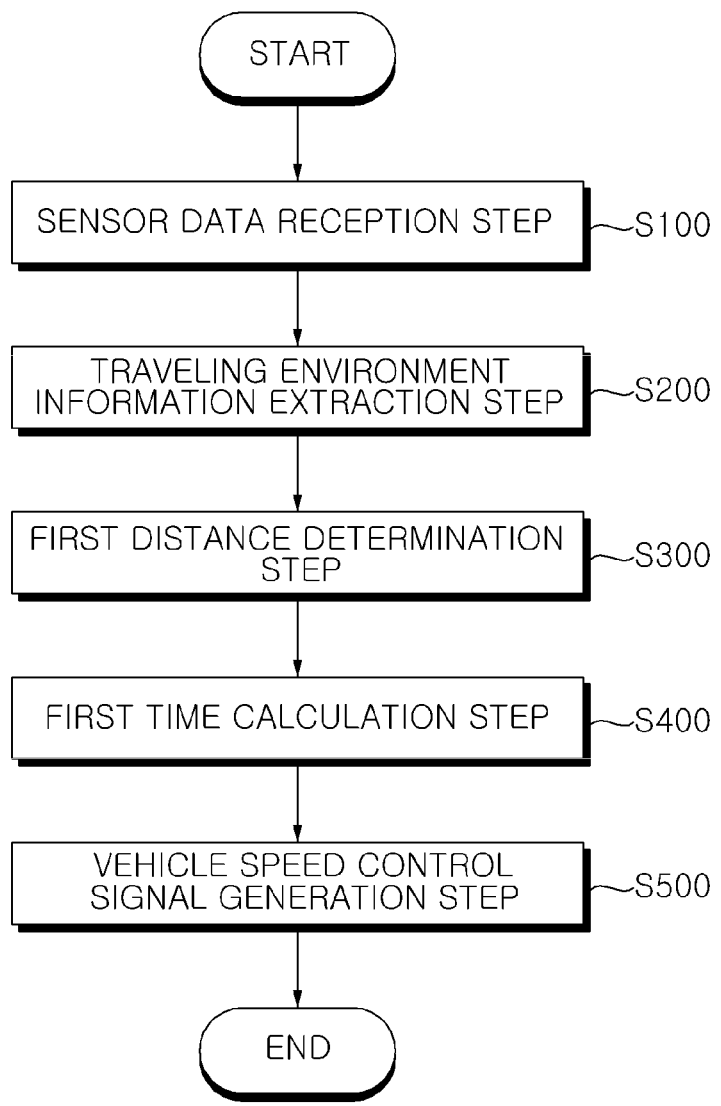
FIG. 5 is a flowchart of the electronic device according to an embodiment of the present invention.

FIG. 5 is a flowchart of the electronic device according to an embodiment of the present invention.

Referring to FIG. 5, the processor 170 may operate the electronic device 100 through a sensor data reception step S100, a traveling environment information extraction step S200, a first distance determination step S300, a first time calculation step S400, and a vehicle speed control signal generation step S500.

The sensor data reception step S300 may be a step of receiving object information detected by the object detection device 210. The sensor data reception step S300 may be a step of receiving GPS information produced by the position data production device 280. The sensor data reception step S300 may be a step of receiving in-vehicle data sensed by the sensing unit 270. The processor 170 may receive sensor data through the interface unit 180.

The traveling environment information extraction step S200 may be a step of extracting information as to the current travel road and information as to peripheral objects, based on the received sensor data. The peripheral object information may be information as to obstacles including kinds, number, and height of obstacles disposed in a traveling direction, and a detailed description thereof may refer to FIGS. 5 and 6.

The first distance determination step S300 may be a step of determining an estimated arrival distance of a communication signal, that is, a first distance, taking into consideration congestion of a communication channel and an LOS environment. The first distance may also be varied in accordance with weather and features as well as kinds of roads and the presence of peripheral obstacles. For example, the first distance in rainy weather or cloudy weather may be shorter than that in fine weather. For example, the first distance on land having features of many mountains and hills therearound may be shorter than on level land. For a detailed description, refer to FIG. 8.

The first time calculation step S400 may calculate the first distance by dividing the first distance by the current speed of the vehicle 10. The first distance is determined in step S300. When the current speed of the vehicle 10 is high, the first time may be short. When the current speed of the vehicle 10 is low, the first time may be long. When the first time increases, safety may be secured because the time taken for speed control is increased. However, when the speed is excessively low, it may be impossible to maintain a smooth traffic flow. Accordingly, it may be important to maintain an appropriate first time.

The vehicle speed control signal generation step S500 may be a step of controlling a vehicle speed in order to secure the first time. In order to secure the first time, the first time may be compared with a minimum time to prepare for danger. For a detailed description, refer to FIGS. 10 and 11.

Figure 6:
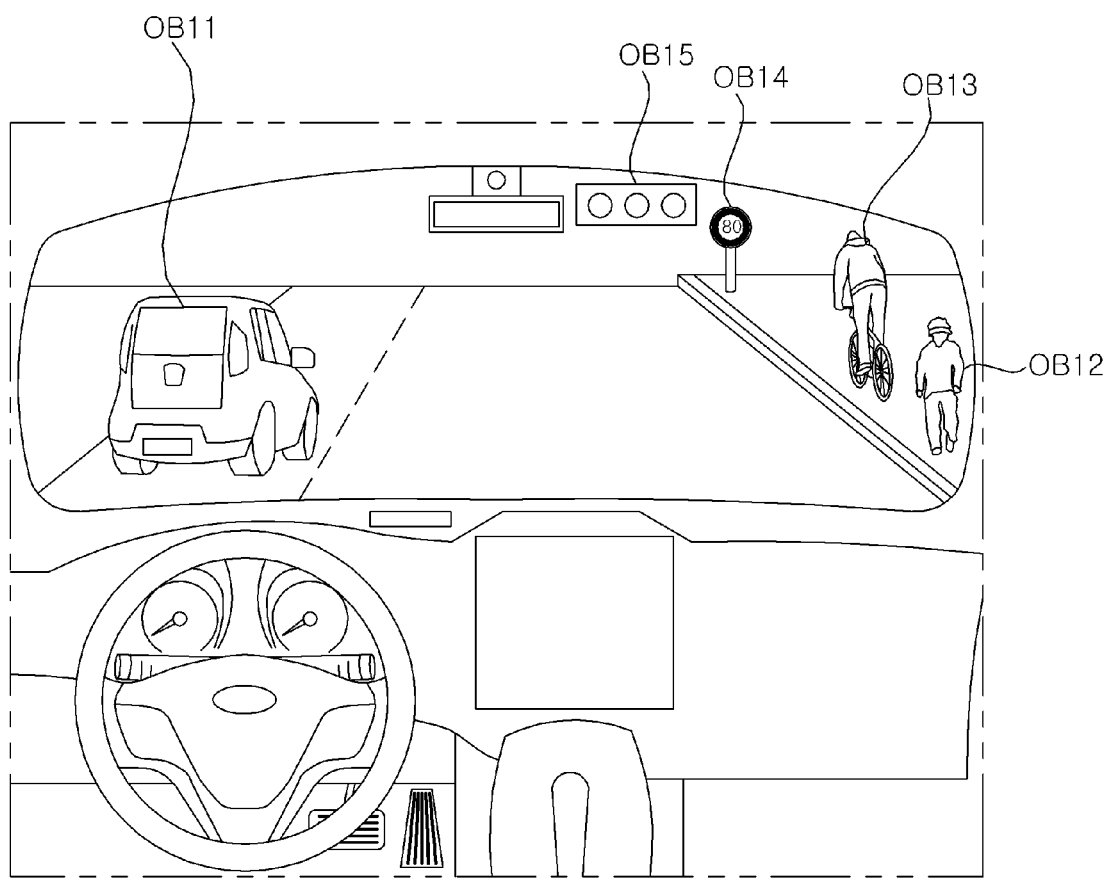
FIGS. 6, 7A and 7B are views explaining object information for acquisition of traveling environment information according to an embodiment of the present invention.
Figure 7A:
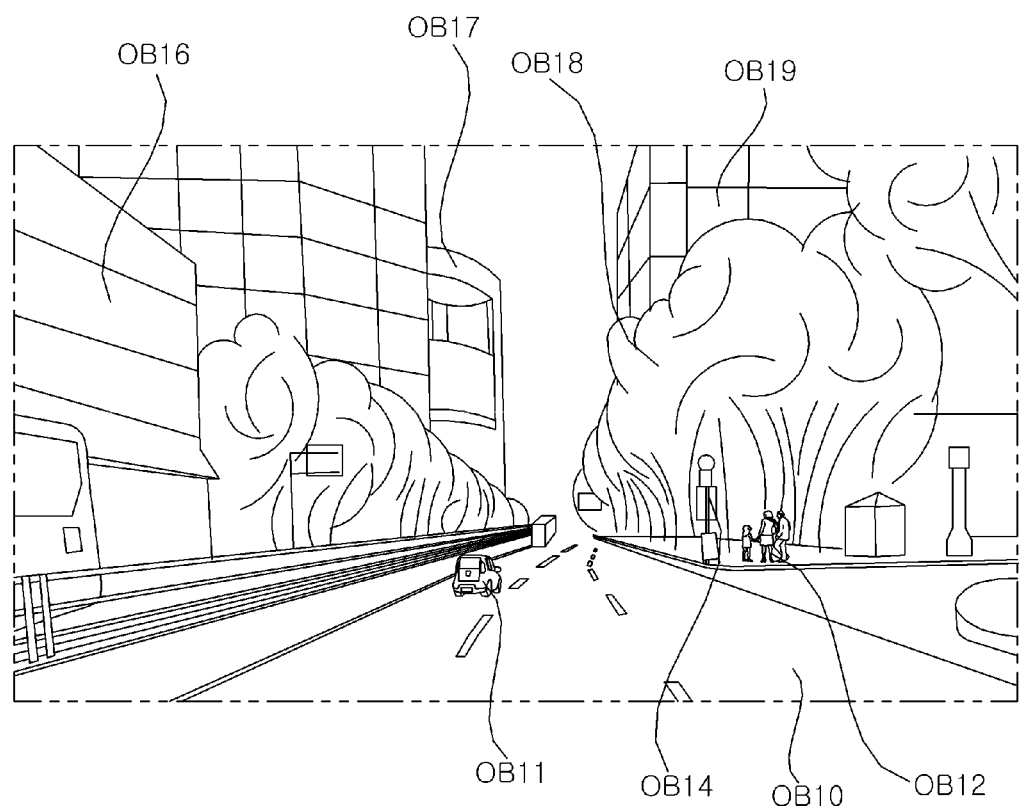
Figure 7B:
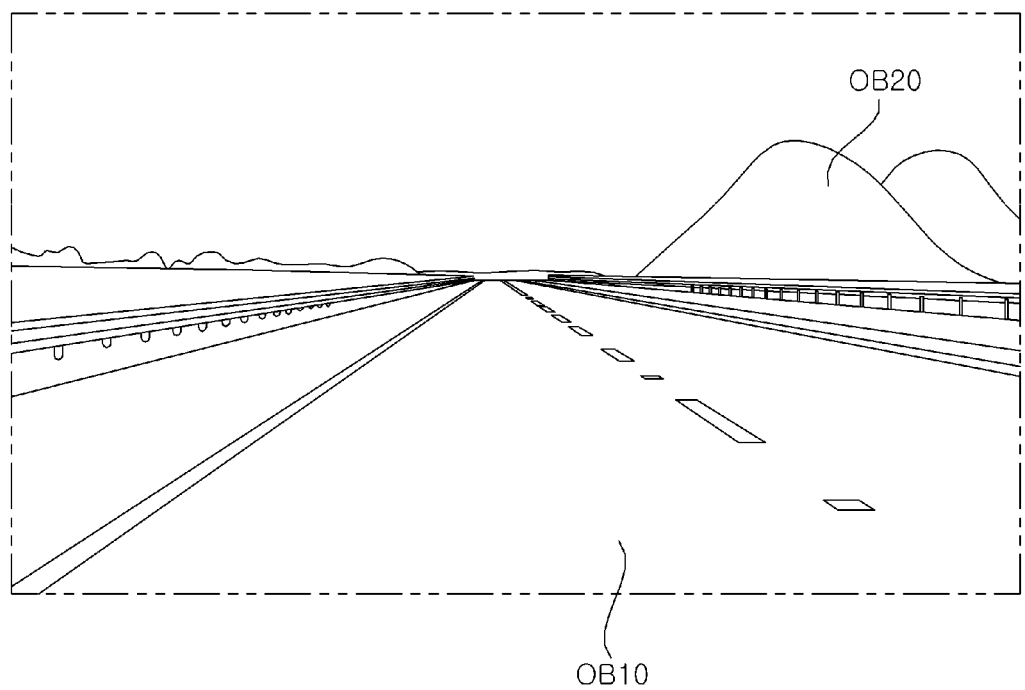

FIGS. 6, 7A and 7B are views explaining object information for acquisition of traveling environment information according to an embodiment of the present invention.

The traveling environment information may include object information including kinds, number, and heights of objects disposed in a traveling direction and acquired by the object detection device 210, and GPS information acquired by the position data production device 280.

Referring to FIG. 6, the objects may be various objects associated with traveling of the vehicle 10. For example, the objects may include a lane OB10, another vehicle OB11, a pedestrian OB12, a two-wheeled vehicle OB13, traffic signs OB14 and OB15, a road, a structure, a land feature, a speed bump, lights, an animal, etc.

The lane OB10 may be a travel lane, a lane next to the travel lane, or a lane on which an opposite vehicle travels. The lane OB10 may be a concept including left and right lines defining the lane. The lane may be a concept including a crossroads.

The other vehicle OB11 may be a vehicle traveling around the vehicle 10. The other vehicle may be a vehicle positioned within a predetermined distance from the vehicle 10. For example, the other vehicle OB11 may be a vehicle traveling while preceding or following the vehicle 10.

The pedestrian OB12 may be a person positioned around the vehicle 10. The pedestrian OB12 may be a person positioned within a predetermined distance from the vehicle 10. For example, the pedestrian OB12 may be a person positioned on a pedestrian road or a vehicle road.

The two-wheeled vehicle OB13 may be positioned around the vehicle 10, and may mean a carriage moving using two wheels. The two-wheeled vehicle OB13 may be a carriage having two wheels while being positioned within a predetermined distance from the vehicle 10. For example, the two-wheeled vehicle OB13 may be a motorcycle or a bicycle positioned on a pedestrian road or a vehicle road.

The traffic signs may include a traffic signal lamp OB15, a traffic signboard OB14, and patterns or text drawn on a road surface.

The road may include a road surface, a curve, and a slope such as an uphill or a downhill.

The structure may be an object disposed around a road while being fixed to the ground. For example, the structure may include a street lamp, a street tree, a building, a telegraph pole, a signal lamp, a bridge, a curbstone, and a wall surface.

The land feature may include a mountain, a hill, etc.

Referring to FIGS. 7A and 7B, a difference between object information obtained through a traveling image on a general road in a downtown area and object information obtained through a traveling image on an expressway in a suburb may be seen. The object information on the general road in the downtown area may be complex, as compared to the object information on the expressway in a suburb.

For example, as illustrated in FIG. 7A, on a general road in a downtown area, a lane OB10, another vehicle OB11, pedestrians OB12, a traffic signboard OB14, and various structures OB16, OB17, OB18, and OB19 may be detected as objects. Object information acquired based on detected results while including kinds, number and heights of objects positioned in a traveling direction may be complex.

For example, as illustrated in FIG. 7B, on an expressway in a suburb, a lane OB10, another vehicle OB11, and a simple land feature OB20 may be detected as objects. Object information acquired based on detected results while including kinds, number and heights of objects positioned in a traveling direction may be simple.

FIG. 8 is a diagram illustrating results of a first distance measurement simulation according to an embodiment of the present invention.

Referring to FIG. 8, an estimated arrival distance of a V2X communication signal may be varied in accordance with travelling environment information. Through simulated results, the arrival distance of a DSRC signal in a downtown area is estimated to be 58.91 m at a vehicle speed of 60 km/h and at a packet receiving ratio (PRR) of 90%, and the arrival distance of a DSRC signal on an expressway is estimated to be 152.49 m at a vehicle speed of 70 km/h and at a PRR of 90%. That is, the first distance may be varied in accordance with whether traveling environment information is associated with a downtown area or an expressway.

The traveling environment information may be on the basis of the object information acquired by the object detection device 210. When the object information is complex, the traveling environment information may also be complex. The object information may be classified in accordance with a traveling environment state.

The traveling environment state may be classified into a downtown area, a suburb, and a wide-open area. Object information in a suburb may be more complex than that in a wide-open area. Object information in a downtown area may be more complex than that in a suburb.

The traveling environment state may be classified in accordance with kinds of roads. Object information on a general road may be more complex than that on an expressway.

Objects detected on a general road 601 in a downtown area are various, and object information, which can be acquired from the detected objects, is complex, and, as such, traveling environment information associated therewith may also be complex. Objects detected on an expressway 602 in a suburb are not various, and object information, which can be acquired from the detected objects, is simple, and, as such, traveling environment information associated therewith may also be simple.

The first distance may mean an estimated arrival distance of a V2X communication signal. The first distance may be determined based on travelling environment information, taking into consideration congestion of a communication channel and a line-of-sight (LOS) environment.

Congestion of a communication channel may mean a level of congestion of a channel used for V2X communication. When plural wireless communication devices use the same channel or adjacent channels, the wireless communication channels may be congested due to frequency interference, etc. That is, when plural objects positioned around the subject vehicle use the same channel or adjacent channels, communication channel congestion may cause problems such as communication speed decrease or communication channel disconnection.

It may be possible to check whethert there is communication channel congestion by checking whether or not a packet error rate (PER) or a retransmission rate (RR) is equal to or higher than a predetermined reference value.

The line-of-sight (LOS) environment means a communication environment in which there is no obstacle, differently from a non-lind-of-sight (NLOS) environment. In other words, the LOS environment may mean a communication environment in which a radio wave used in communication is not subjected to reflection, diffraction, scattering, etc. The radio wave in the LOS environment does not suffer from multipath because the radio wave is not subjected to reflection, diffraction, scattering, etc. and, as such, there may be no problem such as a transmission delay time caused by multiple paths.

The traveling environment information may be determined, taking into consideration whether or not the LOS environment has been damaged due to reflection, diffraction, scattering, etc. of the radio wave in the LOS environment. The possibility of damage to the LOS environment may increase when the number of obstacles in the communication environment increases.

In the present embodiment, there may a plurality of obstacles interfering with signals transmitted and received between communication devices. Due to such obstacles, different signal paths may be created. For example, a first path may be a linear path from a first communication device to a second communication device while passing through an obstacle. Such a linear signal path may be a line-of-sight (LOS) path. Another path, that is, a second path, may be a bypass path from the first communication device to the second communication device while reflecting from an obstacle. Such a bypass path may be a non-LOS path.

Figure 9:
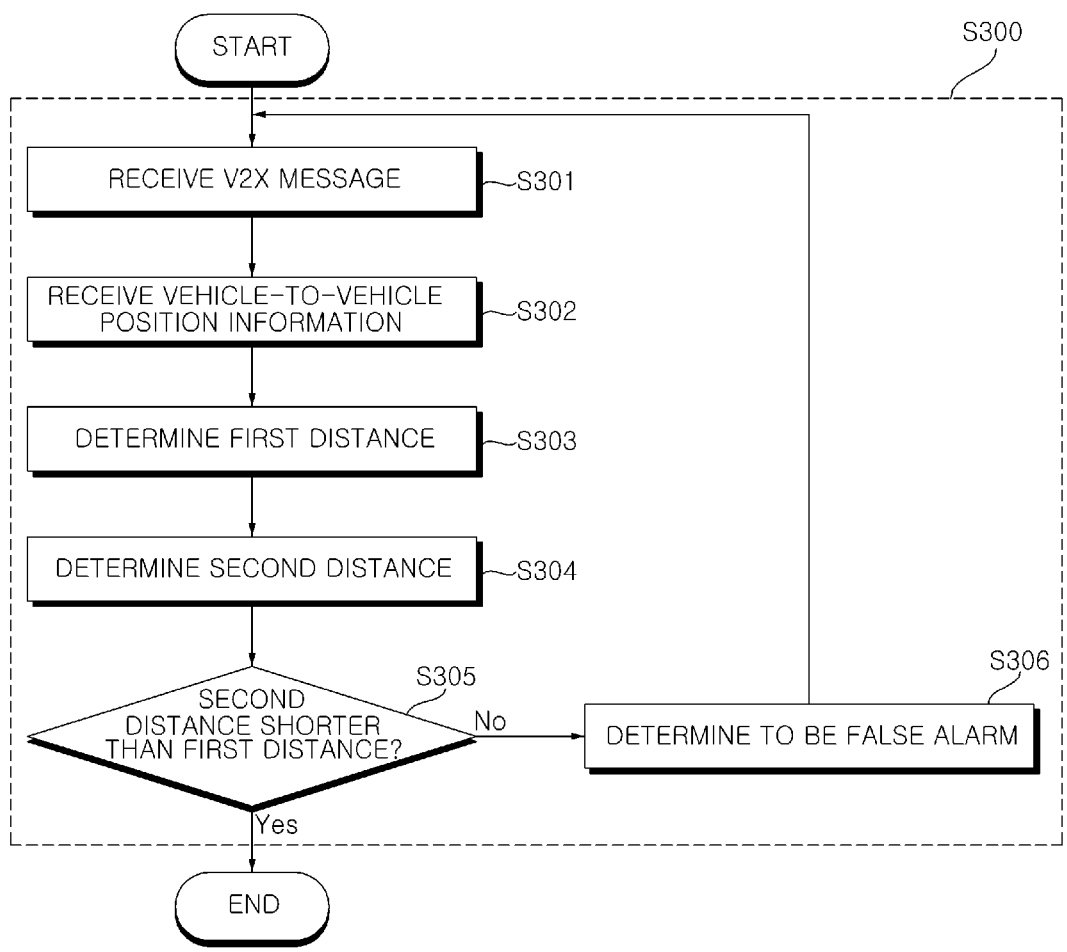
FIG. 9 is a flowchart implementing a first distance determination step S300 according to an embodiment of the present invention.

FIG. 9 is a flowchart implementing the first distance determination step S300 according to an embodiment of the present invention.

Referring to FIG. 9, the first distance determination step S300 receives a V2X message (301), and receives vehicle-to-vehicle position information (302), thereby determining a first distance (303) and determining a second distance (304). Upon determining that the first distance is shorter than the second distance, the first distance determination step S300 proceeds to the first time determination step S400.

The second distance may be determined by the processor by receiving V2X messages from other vehicles via the interface unit, acquiring arrival distances on a message basis, based on the V2X messages and the vehicle-to-vehicle position information, and extracting a farthest one of the arrival distances acquired on a message basis.

Each V2X message may include various information. The processor 170 may analyze a V2X message received from a remote vehicle, thereby extracting a message associated with the vehicle 10. The processor 170 may receive vehicle-to-vehicle position information (302), thereby determining a message arrival distance.

The first distance may be varied in accordance with traveling environment information, communication channel congestion, and an LOS environment. As illustrated in FIG. 8, the first distance may be varied in accordance with kinds of roads and the presence of peripheral obstacles. For example, the first distance may be determined to be shortest in a downtown area, long in a suburb, and longest in a wide-open area. In addition, the first distance may be varied in accordance with weather and features.

The second distance may be determined by extracting a farthest one of arrival distances of V2X messages received from remote vehicles. The second distance may be a farthest one of distances of messages sent from remote vehicles and messages as vehicle-to-vehicle position information within a predetermined angle in a traveling direction of the vehicle 10. The second distance may be equal to or different from the first distance.

The processor 170 may compare the first distance and the second distance with each other. The processor 170 may determine whether the second distance is shorter than the first distance (305). When the first distance is shorter than the second distance, the processor 170 may determine messages received from a farther distance than the first distance as false alarms (306).

Content analyzed from messages determined to be false alarms may not be used for vehicle control. It may be possible to reduce probability of a false alarm by extracting an arrival distance of a V2X message received from a remote vehicle in an advancing direction, and comparing the extracted arrival distance with the first distance.

When the first distance is shorter than the second distance, content extracted from messages received from other vehicles in association with the vehicle 10 may be used for control of the vehicle 10.

Figure 10:
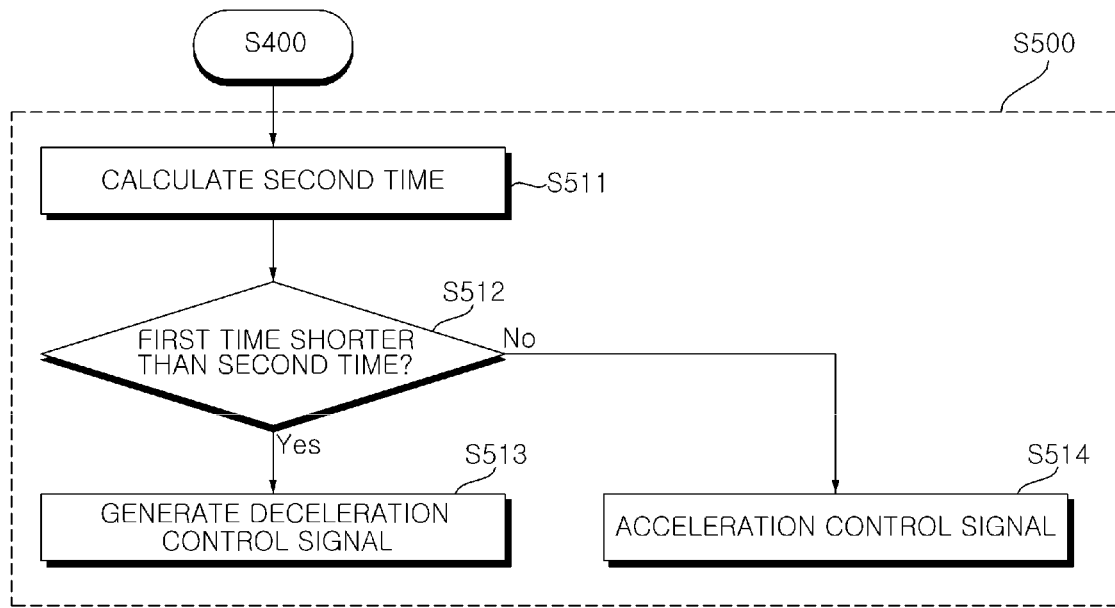
FIGS. 10 and 11 are flowcharts implementing a vehicle speed control signal generation step S500 according to an embodiment of the present invention.
Figure 11:
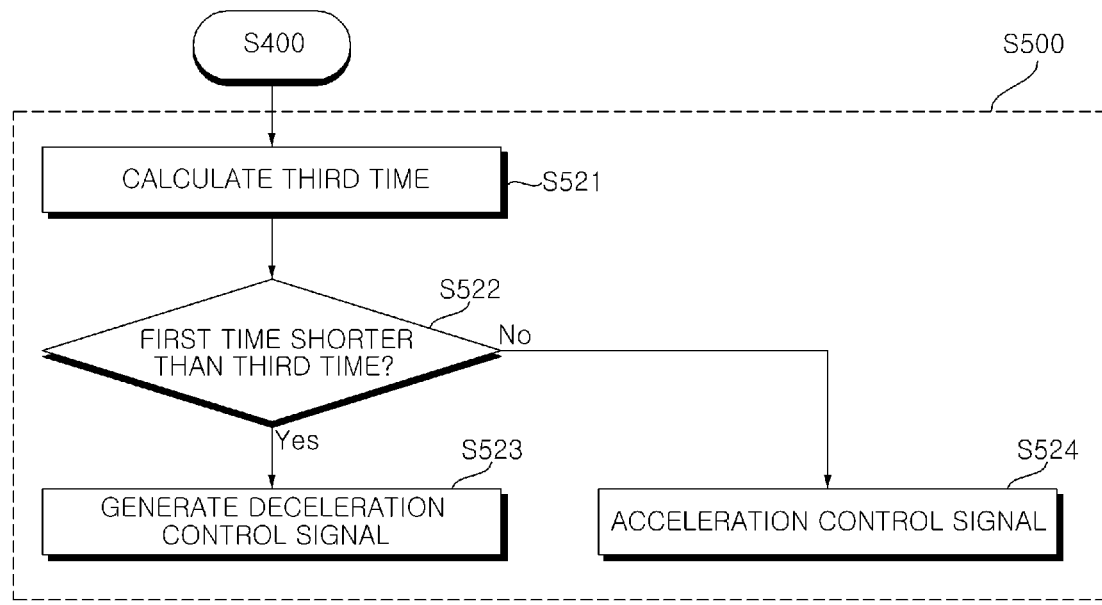

FIGS. 10 and 11 are flowcharts implementing the vehicle speed control signal generation step S500 according to an embodiment of the present invention.

Referring to FIG. 10, the vehicle speed control signal generation step S500 may include procedures of calculating a second time (511), determining whether or not the first time is shorter than the second time, (512), generating a deceleration control signal based on the second time when the first time is shorter than the second time (513), and generating an acceleration control signal based on the second time when the first time is longer than the second time (514).

The second time may be a minimum time to prepare for danger for the driver. The second time may mean a minimum time taken for the driver to identify a dangerous factor in a traveling situation, and then to cope with the dangerous factor. The second time may be varied in accordance with drivers.

The second time may be predetermined and stored. For example, the second time may be set to 4 seconds, and the set time may be stored. When the calculated first time is 3 seconds, which is shorter than 4 seconds, a deceleration control signal is generated such that the first time becomes 4 seconds (513). When the calculated first time is 5 seconds, which is longer than 4 seconds, an acceleration control signal may be generated such that the first time becomes 4 seconds (514). The acceleration control signal may be generated by an input signal from the driver.

Referring to FIG. 11, the vehicle speed control signal generation step S500 may include procedures of calculating a third time (521), determining whether or not the first time is shorter than the third time, (522), generating a deceleration control signal based on the third time when the first time is shorter than the third time (523), and generating an acceleration control signal based on the third time when the first time is longer than the third time (524).

The third time may mean a minimum time taken for the processor 170 to identify a dangerous factor in a traveling situation, and then to generate a control signal coping with the dangerous factor.

The third time may be varied or may be non-uniform in accordance with autonomous performance. The third time may be lengthened in a complex scenario or in a situation not stored. The third time may be exhibited to be long in an old vehicle.

For example, the third time may be calculated to be 2 seconds. When the calculated first time is 1 second, which is shorter than 2 seconds, a deceleration control signal is generated to cause the first time to be 2 seconds (523). When the calculated first time is 3 seconds, which is longer than 2 seconds, an acceleration control signal may be generated to cause the first time to be 2 seconds (524). The acceleration control signal may be generated by an input signal from the driver.

The acceleration control signal may be generated based on a longer one of the second time and the third time. For example, when the second time is 4 seconds and the third time is 2 seconds, the acceleration control signal is generated based on the second time. When the second time is 4 seconds, and the third time is 5 seconds, the acceleration control signal is generated based on the third time.

The acceleration control signal may be generated based on an input signal from the driver as to whether the acceleration control signal should be generated. Accordingly, it may be possible to prevent acceleration from occurring even when the driver does not desire acceleration.

Figure 13A:
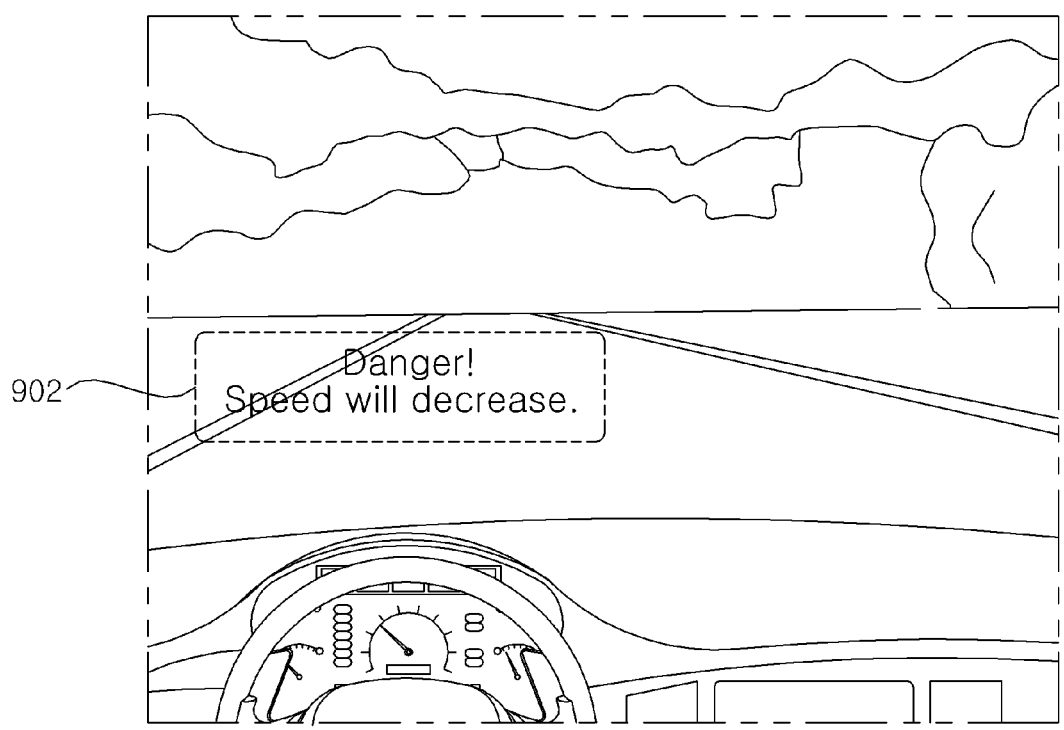
Figure 13B:
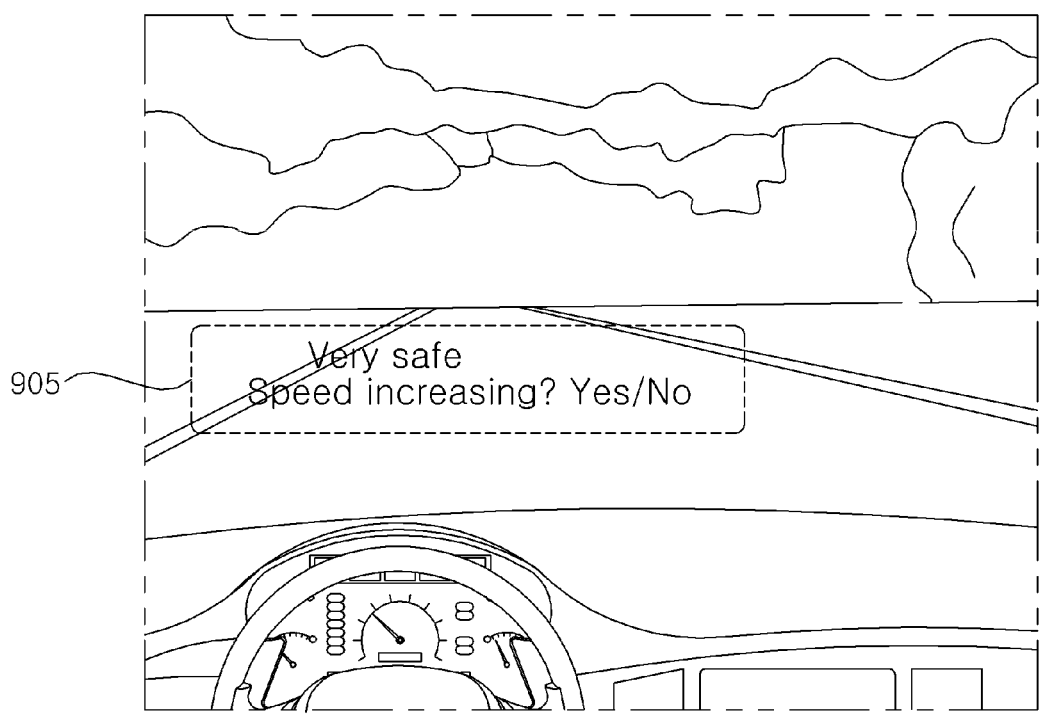

FIGS. 12, 13A, and 13B are views illustrating danger state messages in periods of the first time according to an embodiment of the present invention.

Referring to FIG. 12, the first time is classified into periods. For example, the first time may be classified into a first period P1 in which the first time exceeds 0 seconds, but is equal to or less than 1 second, a second period P2 in which the first time exceeds 1 second, but is equal to or less than 3 seconds, a third period P3 in which the first time exceeds 3 seconds, but is equal to or less than 5 seconds, a fourth period P4 in which the first time exceeds 5 seconds, but is equal to or less than 7 seconds, and a fifth period P5 in which the first time exceeds 7 seconds, The processor 170 may predetermine danger state messages in accordance with different periods. The danger state messages may be messages indicating danger levels. For example, danger levels may be predetermined in such a manner that P1 corresponds to Very Dangerous 901, P2 corresponds to Dangerous 902, P3 corresponds to Normal 903, P4 corresponds to Safe 904, and P5 corresponds to Very Safe 905.

The processor 170 may calculate the first time on a real-time basis, and may generate a signal indicating a danger state message corresponding to the period to which the first time calculated on a real-time basis belongs. For example, when the first time is calculated to be 1.5 seconds, the first time corresponds to the period P2 and, as such, a state message indicating a danger level representing Dangerous 902 may be displayed.

The state message indicating a danger level may be a signal for displaying letters and a color representing the danger level. The color may be stored together with the letters. For example, Very Dangerous 901 may be displayed together with a red background, Dangerous 902 may be displayed together with an orange background, Normal 903 may be displayed together with a yellow background, Safe 904 may be displayed together with a green background, and Very Safe 905 may be displayed together with a blue background. Alternatively, Very Dangerous 901 may be displayed with red letters, Dangerous 902 may be displayed with orange letters, Normal 903 may be displayed with yellow letters, Safe 904 may be displayed with green letters, and Very Safe 905 may be displayed with blue letters.

The number, range, state messages and colors of the periods may be varied.

Referring to FIGS. 13A and 13B, it can be seen that state messages of the periods P2 and P5 are displayed on a HUD in accordance with results of calculation of the first time. Messages associated with vehicle speed control signals may be displayed together with danger state messages.

For example, as illustrated in FIG. 13A, a message "Speed will decrease" may be displayed together with the danger state message of "Dangerous 902". The danger state message may be displayed with an orange color.

For example, as illustrated in FIG. 13B, a message "Speed increasing? Yes/No" may be displayed together with the danger state message of "Very Safe 905". The danger state message may be displayed with a blue color.

Although not shown, when a period shift among the periods corresponding to the first time occurs, the period shift may be displayed to the driver. For example, when an abrupt accident or a traffic delay phenomenon occurs in a traveling direction in the period P3 during traveling, the first distance is reduced and, as such, a period shift to the period P2 may occur. In this case, the period shift to the period P2 and Dangerous 902 are displayed and, as such, the driver may efficiently cope with an abruptly varied traveling situation.

FIGS. 14 to 17 are diagrams illustrating a procedure of generating the first time and the speed control signal on a general road in a downtown area or an expressway in accordance with an embodiment of the present invention.

Figure 14:
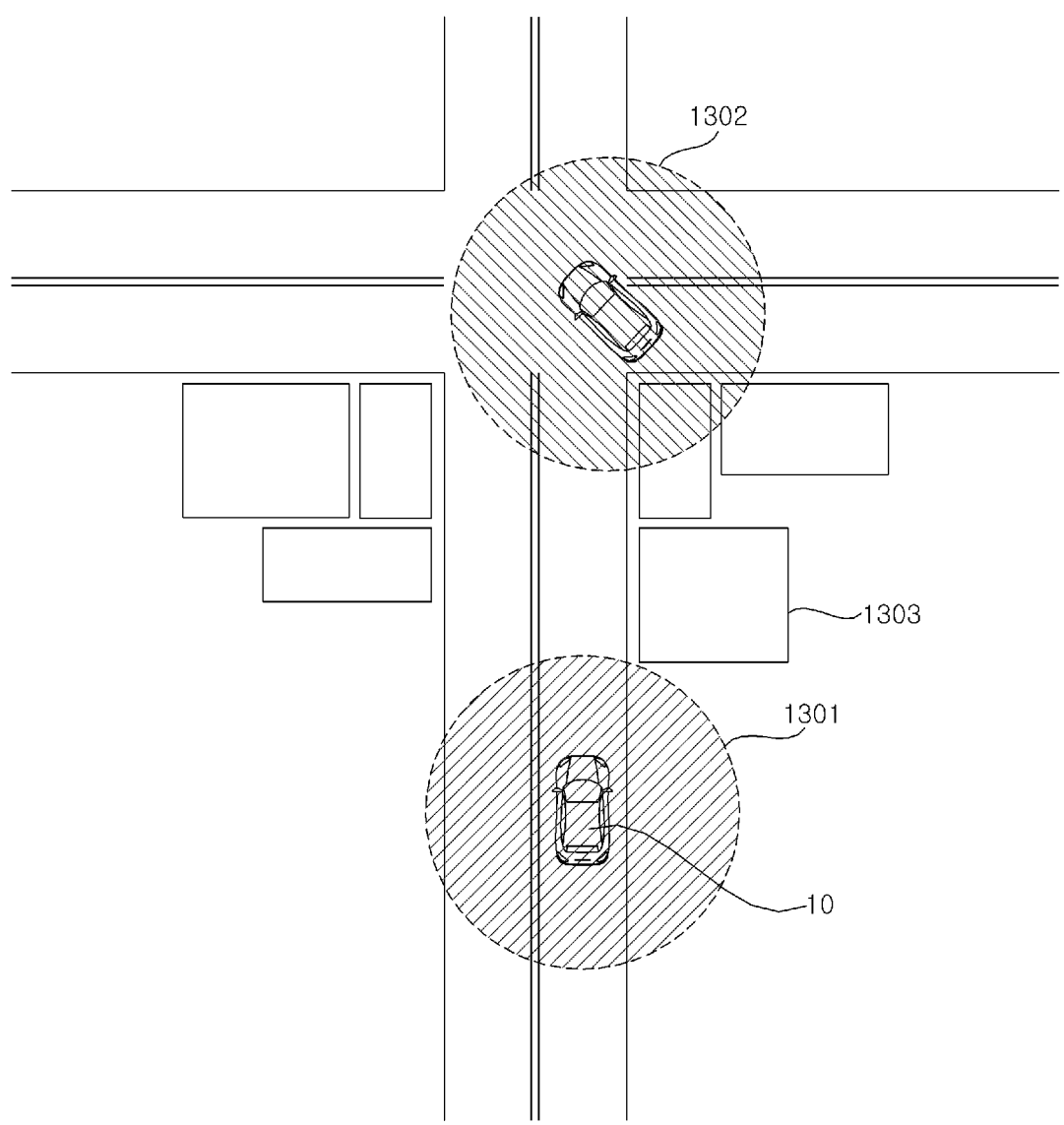

Referring to FIG. 14, the first distance of the subject vehicle 10 may be calculated to be 60 m on a general road in a downtown area due to a peripheral obstacle 1303 such as a building. The first distance of another vehicle may also be 60 m. The second time may be 4 seconds, and the third time of the subject vehicle 10 may be 2 seconds.

When a first distance area 1301 of the subject vehicle 10 overlaps with a first distance area 1302 of another vehicle, the subject vehicle 10 may cope with abrupt appearance of the other vehicle while performing transmission and reception of V2X messages with the other vehicle.

The first distance area 1301 or 1302 is an area having the first distance as a radius about a center of the associated vehicle, and may mean an area in which transmission and reception of V2X messages with another vehicle may be stably carried out.

When the first distance area 1301 of the subject vehicle 10 does not overlap with the first distance area 1302 of the other vehicle, the V2X message of the other vehicle received by the subject vehicle 10 at a longer distance than the first distance of the subject vehicle 10 may be a false alarm. In this case, it may be difficult to cope with abrupt appearance of the other vehicle. In this case, it may be possible to cope with a dangerous situation through speed reduction.

When the current speed of the subject vehicle 10 is 80 km/h, that is, 22 m/s, the first time may be 2.73 seconds (60/22=2.73) and, as such, the current state may be Dangerous 902 of the period P2. When the current speed of the subject vehicle 10 is 40 km/h, that is, 11 m/s, the first time may be 5.45 seconds (60/11=5.45) and, as such, the current state may be Safe 904 of the period P4.

When the current speed of the subject vehicle 10 is 80 km/h, the first time may be 2.73 seconds and, as such, may be shorter than the second time while being longer than the third time. When the first time is present between the second time and the third time, a deceleration control signal may be generated based on a longer one of the second time and the third time. That is, a deceleration control signal may be generated based on the second time which is a longer one of the second time and the third time. In accordance with an embodiment, the speed may be reduced to 15 m/s (60/4=15) based on the second time of 4 seconds.

Figure 15:
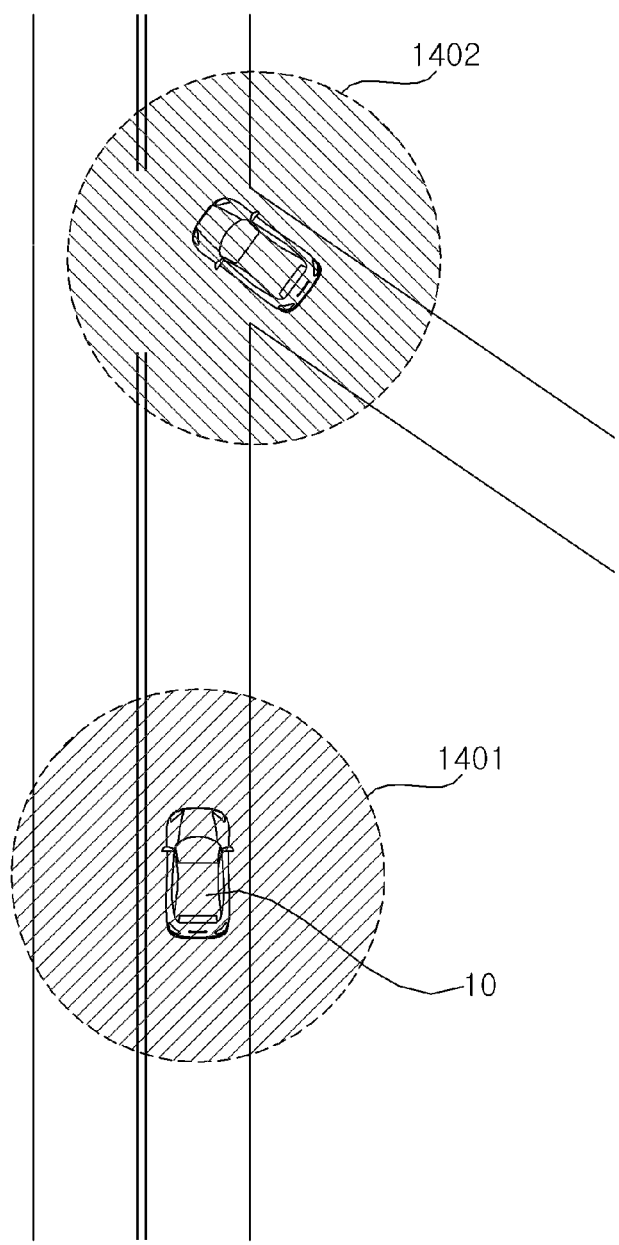

Referring to FIG. 15, the first distance of the subject vehicle 10 may be calculated to be 150 m on an expressway in a suburb. The first distance of another vehicle may also be 150 m. The second time may be 4 seconds, and the third time may be 2 seconds.

When a first distance area 1401 of the subject vehicle 10 overlaps with a first distance area 1402 of another vehicle, the subject vehicle 10 may cope with abrupt appearance of the other vehicle while performing transmission and reception of V2X messages with the other vehicle.

The first distance area 1401 or 1402 is an area having the first distance as a radius about a center of the associated vehicle, and may mean an area in which transmission and reception of V2X messages with another vehicle may be stably carried out.

When the first distance area 1401 of the subject vehicle 10 does not overlap with the first distance area 1402 of the other vehicle, the V2X message of the other vehicle received by the subject vehicle 10 at a longer distance than the first distance of the subject vehicle 10 may be a false alarm. In this case, it may be difficult to cope with abrupt appearance of the other vehicle. In this case, it may be possible to cope with a dangerous situation through speed reduction.

When the current speed of the subject vehicle 10 is 80 km/h, that is, 22 m/s, the first time may be 6.82 seconds (150/22=6.82) and, as such, the current state may be Safe 904 of the period P4. When the current speed of the subject vehicle 10 is 120 km/h, that is, 33 m/s, the first time may be 4.55 seconds (150/33=4.55) and, as such, the current state may be Normal 903 of the period P3.

When the current speed of the subject vehicle 10 is 80 km/h, the first time may be 6.82 seconds and, as such, may be longer than the second time and the third time. When the first time is longer than the second time and the third time, an acceleration control signal may be generated based on a longer one of the second time and the third time, that is, the second time. In this case, an input signal from the driver may be requested. In accordance with an embodiment, acceleration may be achieved up to 37.5 m/s (150/4=37.5) based on the second time of 4 seconds in accordance with an input signal from the driver.

Figure 16:
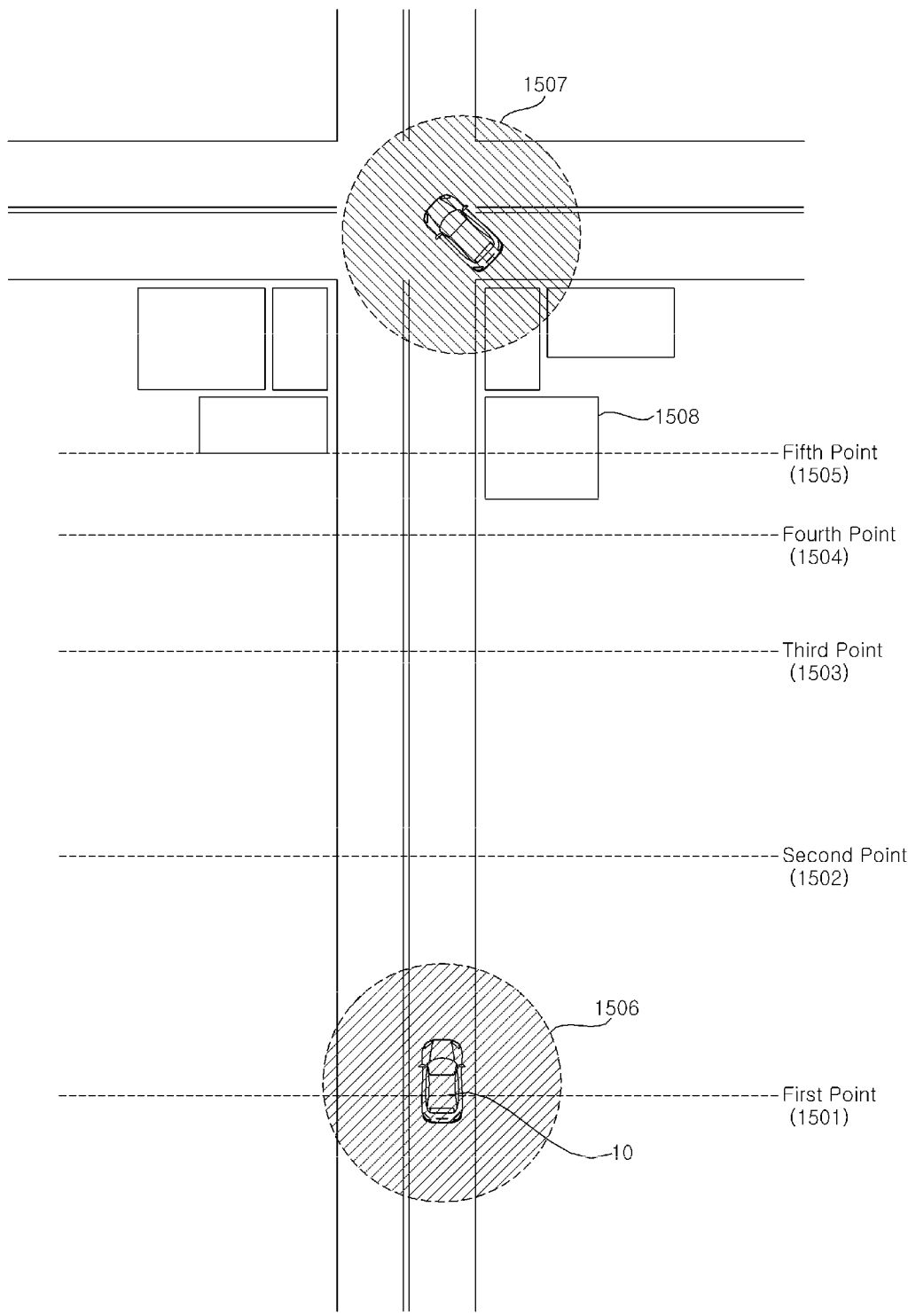

Referring to FIGS. 16 and 17, speed control in a situation in which traveling of the vehicle is changed from a suburb to a downtown area may be seen. The first distance may be 120 m in a suburb, and may be 60 m in a downtown area. When the current speed of the subject vehicle 10 is 80 km/s, and the first time is 5.45 seconds (120/22=5.45), the current state may be Safe 904 of the period P4. The second time may be 4 seconds, and the third time may be 2 seconds. Since there is no input signal from the driver, the current speed may be maintained.

A downtown area may appear in front of the subject vehicle 10 during traveling of the subject vehicle 10 in a suburb. In this state, the subject vehicle 10 may be currently positioned at a first point 1501 which is a suburb point. The subject vehicle 10 may travel to a fifth point 1501 where the subject vehicle 10 enters a downtown area after passing through a second point 1502, a third point 1503, and a fourth point 1504. The first distance may be gradually reduced in accordance with sensor data.

When the first distance at the first point 1501 is 120 m, and the current speed is 22 m/s, the first time may be 5.45 seconds and, as such, may correspond to the period P4. When the first distance at the second point 1502 is reduced to 100 m, and the current speed is 22 m/s, the first time may be reduced to 4.54 seconds. As the first time is reduced, the period P4 may be shifted to the period P3. When there is a period shift, the period shift may be displayed to the driver through the display.

When the first distance at the third point 1503 is reduced to 88 m, and the current speed is 22 m/s, the first time may be reduced to 4 seconds. At the third point 1503, the first time and the second time become equal to be 4 seconds. When the vehicle passes through the third point 1503, the first distance is further reduced and, as such, the first time becomes shorter than the second time. However, a deceleration control signal is generated based on the second time and, as such, the first time may be maintained to be 4 seconds, as in the second time.

The first time at the fourth point 1504 following the third point 1503 is maintained to be 4 seconds. In this case, however, the first distance is reduced to 80 m and, as such, the current speed may be reduced to 20 m/s. The first distance at the fifth point 1505 is 60 m, and the first time is maintained to be 4 seconds and, as such, the current speed may be reduced to 15 m/s.

Although not shown, abrupt traveling environment variation during travelling may be assumed. For example, the case in which the first distance is momentarily shortened due to abrupt travelling delay of vehicles caused by an accident of a preceding vehicle or abruptly varied weather may be assumed.

When the first distance is shortened to 20 m due to abrupt traveling environment variation during traveling at 22 m/s on a road exhibiting a first distance of 60 m, the first time becomes 0.91 seconds (20/22=0.91) and, as such, may correspond to Very Dangerous 901 of the period P1 which, in turn, may be displayed to the driver.

When deceleration control is immediately carried out based on the second time of 4 seconds in this case, abrupt braking at up to 5 m/s may be generated and, as such, travelling stability may be degraded. Therefore, a deceleration control signal taking into consideration traveling stability may be generated in such a manner that abrupt braking up to 10 m/s is preferentially carried out based on the third time of 2 seconds, and gradual braking at up to 5 m/s is then carried out based on the second time of 4 seconds.

The present invention as described above may be embodied as computer-readable code, which can be written on a program-stored recording medium. The recording medium that can be read by a computer includes all kinds of recording media, on which data that can be read by a computer system is written. Examples of recording media that can be read by a computer may include a hard disk drive (HDD), a solid state drive (SSD), a silicon disk drive (SDD), a read only memory (ROM), a random access memory (RAM), a CD-ROM, a magnetic tape, a floppy disk, an optical data storage, etc., and may include an embodiment having the form of a carrier wave (for example, transmission over the Internet). In addition, the computer may include a processor or a controller. Accordingly, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. An operating method of an electronic device for a vehicle comprising:
   receiving, by a processor, sensor data;
   extracting, by the processor, traveling environment information based on the sensor data;
   determining, by the processor, a first distance, which is an estimated arrival distance of a vehicle-to-everything (V2X) communication signal, based on the traveling environment information;
   calculating, the processor, a first time, which is a time to prepare for danger defined by the first distance over a speed of the vehicle;
   generating, by the processor, a signal to control the speed of the vehicle, for securing the first time; and
   determining, by the processor, a second distance, which is a farthest one of arrival distances of V2X messages.
   wherein the second distance is determined by
      receiving the V2X messages from other vehicles via an interface,
      acquiring arrival distances of each message based on the V2X messages and vehicle-to-vehicle position information, and
      extracting a farthest one of the arrival distances.

2. The operating method of the electronic device for the vehicle according to claim 1, wherein the traveling environment information comprises kinds, a number and heights of objects disposed in a traveling direction and acquired by an object detection device, and global positioning system (GPS) information acquired by a position data production device.

3. The operating method of the electronic device for the vehicle according to claim 2, wherein the first distance is determined based on travelling environment information, taking into consideration congestion of a communication channel and a line-of-sight (LOS) environment.

4. The operating method of the electronic device for the vehicle according to claim 3, further comprising:
   comparing, by the processor, the first distance and the second distance with each other,
   wherein the signal to control the speed of the vehicle is generated when the first distance is shorter than the second distance.

5. The operating method of the electronic device for the vehicle according to claim 4, wherein the processor determines the messages received from distances farther than the first distance as false alarms.

6. The operating method of the electronic device for the vehicle according to claim 3, wherein the speed of the vehicle is controlled based on the speed control signal.

7. The operating method of the electronic device for the vehicle according to claim 2, wherein the speed of the vehicle is controlled based on the speed control signal.

8. The operating method of the electronic device for the vehicle according to claim 1, further comprising:
comparing, by the processor, the first time with a minimum time to prepare for danger,
wherein the minimum time to prepare for danger comprises a second time which is a minimum time to prepare for danger for a driver, and a third time which is a minimum time to prepare for danger for an autonomous module.

9. The operating method of the electronic device for the vehicle according to claim 8, wherein:
the second time is a minimum time taken for the driver to identify a dangerous factor in a traveling situation and to cope with the dangerous factor; and
the processor generates a deceleration control signal based on the second time, upon determining that the first time is shorter than the second time which is predetermined.

10. The operating method of the electronic device for the vehicle according to claim 8, wherein:
the third time is a minimum time taken for the processor to identify a dangerous factor in a traveling situation from the sensor data and to generate a control signal coping with the dangerous factor; and
the processor generates a deceleration control signal based on the third time upon determining that the first time is shorter than the third time.

11. The operating method of the electronic device for the vehicle according to claim 8, wherein the processor generates an acceleration control signal based on the minimum time to prepare for danger upon determining that the first time is longer than the minimum time to prepare for danger.

12. The operating method of the electronic device for the vehicle according to claim 11, wherein the acceleration control signal is generated based on an input signal, and the input signal is received from the driver as to whether an acceleration control signal should be generated.

13. The operating method of the electronic device for the vehicle according to claim 12, wherein the processor generates a deceleration control signal based on a longer one of the second time and the third time upon determining that the first time is between the second time and the third time.

14. The operating method of the electronic device for the vehicle according to claim 1, further comprising:
classifying, by the processor, the first time in accordance with periods; and
generating, by the processor, a signal to display a danger state message,
wherein the processor calculates the first time on a real-time basis; and
the processor generates the signal to display a danger state message representing a danger level of a period to which the first time calculated on a real-time basis belongs.

15. The operating method of the electronic device for the vehicle according to claim 14, wherein the signal to display the danger state message is a signal for displaying letters and a stored color corresponding to the danger level.

16. The operating method of the electronic device for the vehicle according to claim 15, wherein the processor generates a signal to display a change of a period corresponding to the first time when the period change occurs during traveling.

17. The operating method of the electronic device for the vehicle according to claim 1, wherein the speed of the vehicle is controlled based on the speed control signal.

18. An electronic device for a vehicle performing transmission and reception of information with other vehicles through direction communication, comprising:
an interface; and
a processor configured to:
acquire traveling environment information on a travel road through the interface,
determine a first distance, which is an estimated arrival distance of a vehicle-to-everything (V2X) communication signal, based on the traveling environment information,
calculate a first time, which is a time to prepare for danger defined by the first distance versus a speed of the vehicle,
generate a signal to control the speed of the vehicle, for secure of the time to prepare for danger, and
determine a second distance, which is a farthest one of arrival distances f everything messages,
wherein the processor is further configured to determine the second distance by
receiving the V2X messages from other vehicles via the interface,
acquiring arrival distances of each message based on the V2X messages and vehicle-to-vehicle position information, and
extracting a farthest one of the arrival distances.

19. The electronic device for the vehicle according to claim 18, wherein the processor is configured to:
classify the first time in accordance with periods;
calculate the first time on a real-time basis; and
generate a signal to display the danger state message representing a danger level of a. period to which the first time calculated on a real-time basis belongs.

* * * * *